(12) United States Patent
Sahashi et al.

(10) Patent No.: US 7,006,273 B2
(45) Date of Patent: Feb. 28, 2006

(54) FARADAY ROTATION DEVICE AND OPTICAL DEVICE USING SAME

(75) Inventors: Teruhisa Sahashi, Minato-ku (JP); Hidenori Nakada, Minato-ku (JP); Hirotaka Kawai, Minato-ku (JP); Isao Kojima, Minato-ku (JP); Tsugio Tokumasu, Minato-ku (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 11/014,085

(22) Filed: Dec. 17, 2004

(65) Prior Publication Data

US 2005/0141075 A1 Jun. 30, 2005

Related U.S. Application Data

(62) Division of application No. 10/343,967, filed as application No. PCT/JP01/06409 on Jul. 25, 2001, now Pat. No. 6,876,480.

(30) Foreign Application Priority Data

| Aug. 11, 2000 | (JP) | ............................. 2000-244943 |
| Nov. 8, 2000 | (JP) | ............................. 2000-339940 |
| Jun. 28, 2001 | (JP) | ............................. 2001-197071 |

(51) Int. Cl.
*G02F 1/09* (2006.01)

(52) U.S. Cl. ...................... 359/280; 359/281; 359/282; 359/283

(58) Field of Classification Search ......... 359/280–283
See application file for complete search history.

(56) References Cited

U.S. PATENT DOCUMENTS

| 4,856,878 | A | | 8/1989 | Wilson et al. | |
| 5,381,261 | A | * | 1/1995 | Hirai et al. | ................. 359/282 |
| 5,889,609 | A | | 3/1999 | Fukushima | |
| 5,973,821 | A | | 10/1999 | Onaka et al. | |
| 6,339,492 | B1 | * | 1/2002 | Terahara et al. | ............ 359/283 |

FOREIGN PATENT DOCUMENTS

| EP | 0 279 412 | 8/1988 |
| EP | 0 932 067 | 7/1999 |
| JP | 55-138711 | 10/1980 |
| JP | 64-20521 | 1/1989 |
| JP | 1-142525 | 6/1989 |
| JP | 3-2819 | 1/1991 |
| JP | 4-366913 | 12/1992 |

(Continued)

*Primary Examiner*—Georgia Epps
*Assistant Examiner*—Joseph Martinez
(74) *Attorney, Agent, or Firm*—Wenderoth, Lind & Ponack, L.L.P.

(57) ABSTRACT

Optical devices including a Faraday rotation devices improved in wavelength and temperature characteristics and an optical attenuator reduced in wavelength dependence and temperature-dependent loss. The Faraday rotation device has permanent magnets magnetized in an axial direction of through-holes, and Faraday elements having a same Faraday rotation direction with respect to a same magnetization direction. The permanent magnets are directed in the same magnetization direction along an optical path, where part of the Faraday elements are accommodated in the through-hole of the permanent magnet, and the remaining Faraday elements are arranged between the magnets, whereby the Faraday elements are to be applied by magnetic fields in opposite directions. For a device variable in Faraday rotation angle, an electromagnet is provided. An input fiber collimator and polarizer are provided on an input side of with the Faraday elements while an analyzer and output fiber collimator are on an output side.

26 Claims, 11 Drawing Sheets

FOREIGN PATENT DOCUMENTS

| | | |
|---|---|---|
| JP | 6-317763 | 11/1994 |
| JP | 10-301070 | 11/1998 |
| JP | 11-231274 | 8/1999 |
| JP | 11-311716 | 11/1999 |
| JP | 2000-249997 | 9/2000 |
| JP | 2000-305057 | 11/2000 |

* cited by examiner

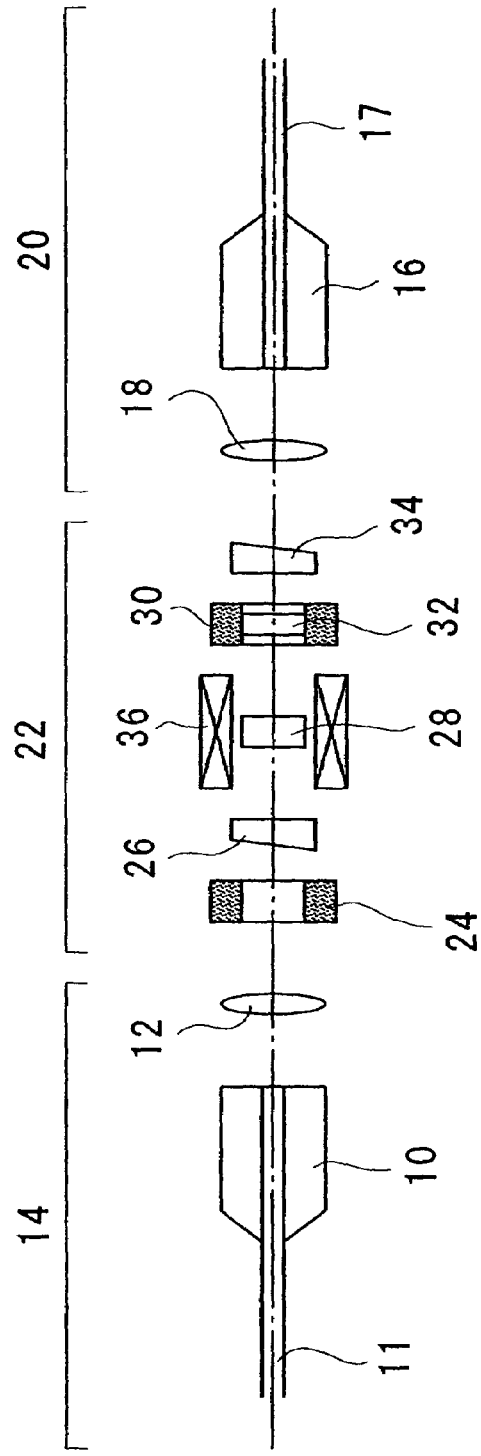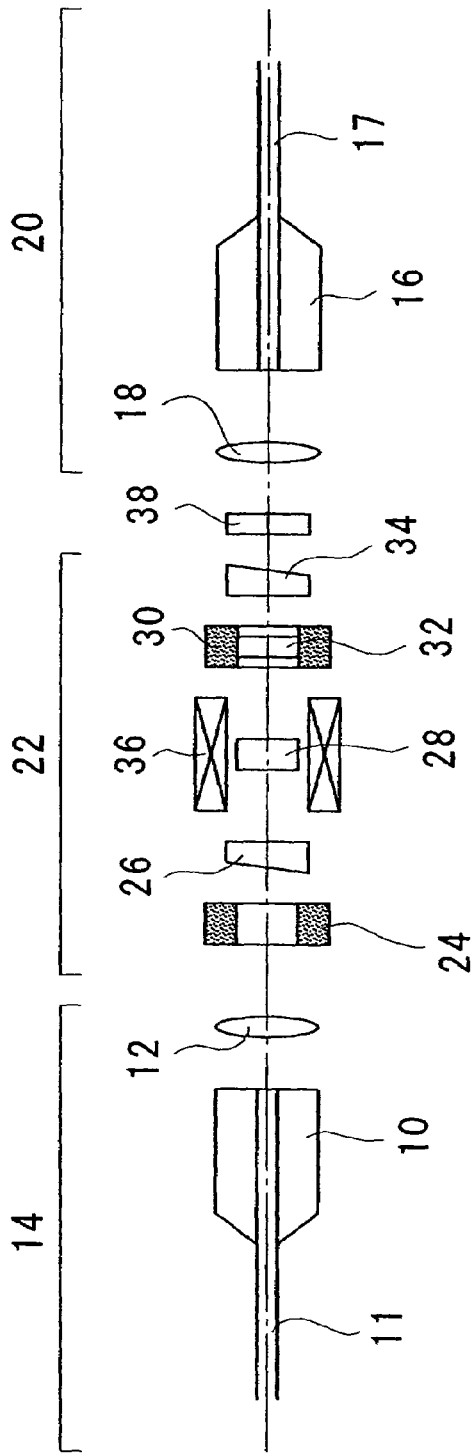

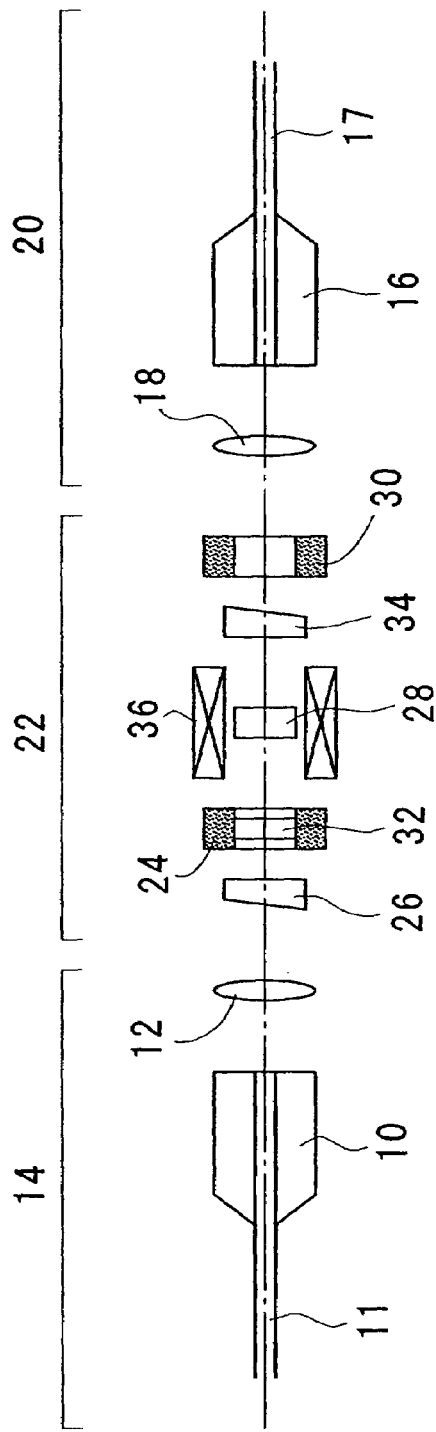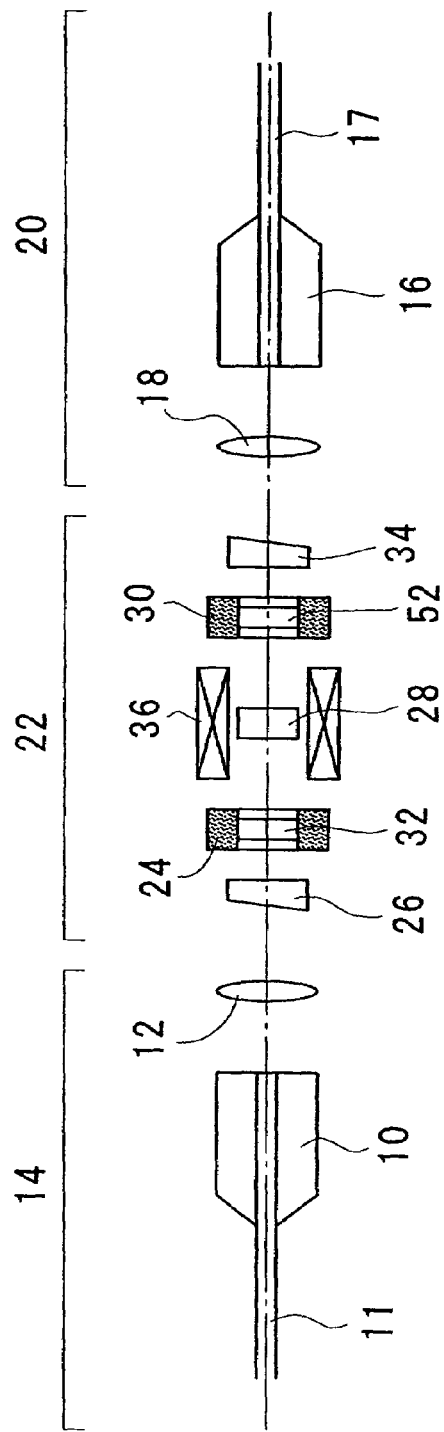

FARADAY ROTATION DEVICE AND OPTICAL DEVICE USING SAME

This is a divisional of U.S. application Ser. No. 10/343,967, filed Feb. 6, 2003, now U.S. Pat. No. 6,876,480, which is a National Stage Application of International Application No. PCT/JP01/06409, filed Jul. 25, 2001.

TECHNICAL FIELD

The present invention relates to a Faraday rotation device having Faraday elements that are provided at the inside and outside of an annular permanent magnet so that magnetic fields can be applied in opposite directions to the Faraday elements, and to an optical device using the same. More specifically, the present invention relates to a Faraday rotation device including a plurality of permanent magnets which have through-holes that are arranged so as to be directed to the same magnetization direction along an optical path so that part of a plurality of Faraday elements, in the same Faraday rotation direction with respect to the same magnetic field direction, is accommodated in the through-hole of the permanent magnet while the remaining ones are arranged between the permanent magnets, thereby enabling magnetic fields to be applied in opposite directions to the part of the Faraday elements and the remaining Faraday elements. This device is useful for an optical attenuator, although not especially limited thereto.

Furthermore, the present invention relates to a variable optical attenuator of an optical fiber coupling type having a polarizer and an analyzer that are arranged on an optical axis in the front and rear of a Faraday rotation angle varying device, and more particularly to a variable optical attenuator having two kinds of Faraday elements, which are different in rotation direction, built in a Faraday rotation angle varying device and an optical filter functioning part having a wavelength-dependent loss reverse in sign thereto so as to reduce wavelength dependency. This variable optical attenuator is particularly useful as an optical fiber coupling type.

BACKGROUND ART

In the optical communication system or optical measurement system, various optical devices are used including optical isolators, optical circulators, optical switches and optical attenuators. These optical devices are built with Faraday rotation devices so as to rotate the polarization plane. The Faraday rotation device is structured so as to apply an external magnetic field to the Faraday element (magnetic garnet single crystal having a Faraday effect), thereby controlling the Faraday rotation angle of a light ray which transmits through the Faraday element. In this case, there are a type in which a fixed magnetic field is applied to the Faraday element to keep the Faraday rotation angle constant (Faraday rotator) and a type in which a variable magnetic field is applied to the Faraday element to variably control the Faraday rotation angle (Faraday rotation angle varying device).

The conventional Faraday rotator is generally of a structure accommodating a Faraday element in a cylindrical permanent magnet. On the other hand, in the case of a Faraday rotation angle varying device, the structure generally has a Faraday element which is arranged between two ring-formed permanent magnets so as to apply a fixed magnetic field that is parallel with a light ray direction while a variable magnetic field is applied orthogonal to the light ray direction by an electromagnet, to change the resultant magnetic field of them and the magnetization direction of the Faraday element, thereby varying the Faraday rotation angle.

Meanwhile, the optical communication system or optical measurement system requires an optical attenuator to control the amount of transmission light. The optical attenuator is structured such that a polarizer and an analyzer are arranged on the optical axis in the front and rear (input and output sides) of a Faraday rotation angle varying device. The Faraday rotation angle varying device incorporated is to apply external magnetic fields in two or more directions to the Faraday element (magnetic garnet single crystal having a Faraday effect) and vary the resultant magnetic field thereof, thereby controlling the Faraday rotation angle of a light ray transmitting through the Faraday element. The variable optical attenuator variably controls the amount of light attenuation by controlling the Faraday rotation angle.

In the optical attenuator, the polarizer and the analyzer may use composite polarization prisms. However, the use of a composite polarization prism reduces the amount of incident light by the polarizer by half. Accordingly, it is usually rather practical to make a fiber-coupled type device in a polarization-independent type by using a wedge-shaped birefringent crystal (e.g. rutil single crystal).

The incident light, from an input fiber, turns into a collimated light in a lens and passes a polarizer, a Faraday element of a Faraday rotation angle varying device and an analyzer in this order, to be focused by a lens and coupled to an output fiber. The Faraday element is applied with a fixed magnetic field which is parallel with the light ray direction by a permanent magnet and with a variable magnetic field orthogonal to the light ray direction by an electromagnet. By changing the resultant magnetic field of these, and hence the magnetization direction of the Faraday element, the Faraday rotation angle is varied to thereby control the amount of the light passing through the analyzer.

Meanwhile, due to the wavelength division multiplex communication which has begun to be placed into practical application, the variable optical attenuator is required to decrease its wavelength dependence at around a particularly required amount of attenuation (particularly in a region having a great attenuation amount) depending upon a service state.

Concerning the reduction in wavelength dependence of a Faraday rotation angle, there is a proposal on a structure of a combination of a garnet single crystal basic film to vary the Faraday rotation angle and a garnet single crystal compensation film to render the Faraday rotation angle nearly constant. However, the problem of wavelength-dependent loss (attenuation amount change with a change of wavelength) has not yet been solved.

For example, in a wavelength division multiplex transmission system using erbium-added optical fiber amplifiers in multiple stages, a variable optical attenuator is used for a level adjustment of amplified signal light. At this time, the synthesized signal light causes a wavelength-dependent loss due to the optical attenuator, which worsens the gain flatness characteristic of the wavelength division multiplex system. For this reason, it is of an extreme important technical problem to suppress, to the minimum, the wavelength-dependent loss at the time of light attenuation.

As in the above, in accordance with the wavelength division multiplex communication that has begun to be placed into practical application, the optical devices in various kinds are required to have a small wavelength dependence. From the viewpoint of reducing the wavelength dependence of Faraday rotation angle, there is a structure of a combination of a garnet single crystal basic film and a garnet single crystal compensation film reverse in Faraday rotation direction to that and nearly constant in Faraday rotation angle.

Particularly, in the Faraday rotation angle varying device to be built in an optical attenuator, there is a need to decrease the wavelength-dependent loss besides the reduction in wavelength dependence. For this reason, there is a proposal of a structure in which a garnet single-crystal compensation film having a nearly constant Faraday rotation angle is arranged besides a garnet single-crystal basic film that Faraday rotation angle changes with varying the resultant magnetic field, wherein the basic film and the compensation film use those different in the sign of Faraday rotation angle, whereby the compensation film reduces the wavelength change amount of Faraday rotation angle through the basic film (JP-A-2000-249997).

In order to realize this, there is a necessity for a compensation film corresponding to a basic film. However, it is not necessarily easy to make a suitable compensation film corresponding to an arbitrary basic film. This is because, although the wavelength characteristic and temperature characteristic of the basic film and compensation film must be offset to a possible great extent, there is limitation in material design due to quite different compositions between the two.

SUMMARY OF THE INVENTION

From the above, it is a principal object of the present invention to provide a Faraday rotation device which is improved in wavelength and temperature characteristics by making a structure to be reverse acted with the wavelength and temperature coefficients of Faraday rotation angle while using a plurality of Faraday elements having the same rotation direction.

Another object of the present invention is to provide various optical devices, such as an optical attenuator, which are reduced in wavelength dependence and temperature-dependent loss by making a structure to be reverse acted with the wavelength and temperature coefficients of Faraday rotation angle while using a plurality of Faraday elements having the same rotation direction.

Further object of the present invention is to provide a variable optical attenuator which is reduced in wavelength-dependent loss.

Yet another object of the present invention is to provide a variable optical attenuator having a structure not requiring to distinguish between input and output.

The present invention is a Faraday rotation device which comprises: a plurality of permanent magnets having through-holes and which are magnetized in an axial direction of the through-hole, and a plurality of Faraday elements having a same Faraday rotation direction with respect to a same magnetization direction. The permanent magnets are arranged so as to be directed in the same magnetization direction along an optical path. Further, part of the Faraday elements are accommodated in the through-hole of the permanent magnet, and the remaining permanent magnets are arranged between the plurality of permanent magnets. Therefore, the part of the Faraday elements and the remaining Faraday elements are to be applied by magnetic fields in opposite directions. This Faraday rotation device can be utilized for an optical isolator, an optical circulator or the like.

Meanwhile, the present invention provides a Faraday rotation device which comprises: a plurality of permanent magnets having through-holes and which are magnetized in an axial direction of the through-hole, a plurality of Faraday elements having a same Faraday rotation direction with respect to a same magnetization direction, and variable magnetic field applying means. Each of the permanent magnets are arranged in a manner so as to be directed in the same magnetization direction along an optical path. The plurality of Faraday elements including part of the Faraday elements which are accommodated in the through-hole of at least one of the permanent magnets. The remaining permanent magnets are arranged between the plurality of permanent magnets. The plurality of permanent magnets apply magnetic fields in opposite directions to the part of Faraday elements and the remaining Faraday elements. The variable magnetic field applying means applies a magnetic field in a direction which is different from a light ray direction to the remaining Faraday elements. This Faraday rotation device can be utilized for an optical switch, an optical attenuator, a polarization scrambler or the like.

In this manner, by accommodating part of the Faraday elements in the through-hole of a permanent magnet and arranging the remaining Faraday element between permanent magnets, those Faraday elements are to be applied by the magnetic fields in opposite directions. This can provide a function of off setting the wavelength and temperature coefficients of a Faraday rotation angle while using the Faraday elements having the same Faraday rotation direction. The characterization of the present invention lies in this point. For example, in the case of a structure having a variable magnetic field applying means, the Faraday element which is positioned between the permanent magnets and which is to be applied by a variable magnetic field serves as a basic film, while the Faraday element which is incorporated in the permanent magnet serves as a compensation film as compared to the prior art.

There are, as typical examples, a structure comprising two permanent magnets and a plurality of Faraday elements, where part of the Faraday elements are accommodated in a through-hole of one of the permanent magnets and the remaining Faraday elements are arranged between both of the permanent magnets, and a structure comprising two permanent magnets and three or more Faraday elements, where part of the Faraday elements are accommodated in through-holes of both of the permanent magnets, the remaining Faraday elements are arranged between both of the permanent magnets. In these structures, usually the Faraday elements are all used in a state which is magnetically saturated by a magnetic field due to the permanent magnet.

The present invention provides an optical device using a Faraday rotation device, as in the above, having a polarizer which is arranged on an input side of an arrangement group of a plurality of Faraday elements and an analyzer which is arranged on an output side of the arrangement group. There is a structure in which the polarizer and the analyzer use wedge-shaped birefringent plates, an input fiber collimator, which is an input fiber and a collimating lens, which is arranged on an input side of the polarizer, an output fiber collimator, which has an output fiber and a collimating lens, which is arranged on an output side of the analyzer.

Meanwhile, the present invention provides an optical attenuator which comprises: two permanent magnets having through-holes and which are magnetized in an axial direction of the through-hole, a plurality of Faraday elements having a same Faraday rotation direction with respect to a same magnetization direction, variable magnetic field applying means, and a polarizer and an analyzer. Both of the permanent magnets are arranged in a manner so as to be directed in the same magnetization direction along an optical path. The plurality of Faraday elements include part of Faraday elements which are accommodated in the through-hole of at least one of the permanent magnets. The remaining Faraday elements are arranged between the plurality of permanent magnets. The plurality of permanent magnets apply fixed magnetic fields for magnetic saturation in opposite directions to the part of Faraday element and the remaining Faraday elements, and the variable magnetic field applying means apply a variable magnetic field in a direction which is different from a light ray direction to the remaining Faraday elements. A polarizer is arranged on an input side of an arrangement group of all of the Faraday elements, and an analyzer is on an output side of the arrangement group.

The Faraday rotation device is the most effective, as a use example, for such an optical attenuator. In such a case, all of the Faraday elements are preferably formed by magnetic garnet single crystals having a same composition and a same property. A fiber type optical attenuator can be structured by arranging an input fiber collimator, which has an input fiber and a collimating lens, on an input side of the polarizer, and by arranging an output fiber collimator, which has an output fiber and a collimating lens, on an output side of the analyzer.

There is, as a concrete example, a structure comprising two permanent magnets and two Faraday elements, wherein the permanent magnet, the polarizer, the Faraday element, the Faraday element which is incorporated in the permanent magnet and the analyzer are arranged in an order from an input side toward an output side along the optical path. In this case, it is preferred that, provided that a rotation angle by the Faraday element positioned between the permanent magnets in a crossed-Nicols state is $\theta_{1k}$, a polarizer optical-axis angle $\theta_f$ from an electromagnet magnetic field direction by the variable magnetic field applying means is:

$\theta_f \approx \theta_{1k}/2 + n\pi/2$ (where $n=0, 1$)

There are, as concrete other examples, a structure comprising two permanent magnets and two Faraday elements, wherein the polarizer, the Faraday element which is incorporated in the permanent magnet, the Faraday element, the analyzer and the permanent magnet are arranged in an order of from an input side toward an output side along the optical path, and a structure comprising two permanent magnets and three Faraday elements, wherein the polarizer, the first Faraday element which is incorporated in one of the permanent magnet, the second Faraday element, the third Faraday element which is incorporated in the other one of the permanent magnet and the analyzer are arranged in an order from an input side toward an output side along the optical path. In these cases, it is preferred that, provided that a rotation angle by the Faraday element which is positioned between the permanent magnets in a crossed-Nicols state is $\theta_{1k}$ and a rotation angle by the Faraday element which is incorporated in the permanent magnet is $\theta_2$, then a polarizer Optical-axis angle $\theta_f$ from an electromagnet magnetic field direction by the variable magnetic field applying means is:

$\theta_f \approx \theta_{1k}/2 - \theta_2 + n\pi/2$ (where $n=0, 1$).

Meanwhile, in these optical attenuators, it is favorable that, provided that a maximum rotation angle by the Faraday element which is positioned between the permanent magnets is $\theta_{1max}$, a minimum rotation angle is $\theta_{1min}$ and a rotation angle by the Faraday element incorporated in the permanent magnet is $\theta_2$, then the following relationship is satisfied:

$|\theta_{1min}| \leq |\theta_2| \leq |\theta_{1max}|$.

Furthermore, it is favorable that the polarizer and the analyzer use wedge-shaped birefringent plates, an optical axis of the analyzer is given 0–90 degrees from an orientation of an optical axis of the polarizer as viewed in a rotation direction on the Faraday element which is positioned between the permanent magnets.

In the optical attenuator, a structure is effective in which an optical filter functioning part is provided that has a wavelength-dependent loss which is reverse in sign to a wavelength-dependent loss to be caused by the Faraday rotation device. In such a case, it is favorable that, provided that a maximum wavelength-dependent loss gradient in an optical attenuator, in the absence of an optical filter functioning part, is WDL1 and a minimum wavelength-dependent loss gradient is WDL2, then a wavelength-dependent loss gradient X of the optical filter functioning part is:

X≈−(WDL1+WDL2)/2. Alternatively, provided that a maximum wavelength-dependent loss gradient in an arbitrary service attenuation range in an optical attenuator, in the absence of an optical filter functioning part, is WDL3 and a minimum wavelength-dependent loss gradient is WDL4, then a wavelength-dependent loss gradient X of the optical filter functioning part is:

$X \approx -(WDL3+WDL4)/2$.

Furthermore, the present invention is premised on a variable optical attenuator having a structure which is arranged with a polarizer, a Faraday rotation angle varying device and an analyzer in this order, or a variable optical attenuator having a structure which is arranged with an input fiber, a lens, a polarizer, a Faraday rotation angle varying device, an analyzer, a lens and an output fiber in this order. In one embodiment of the present invention, the Faraday rotation angle varying device comprises: a first Faraday element; a second Faraday element which is different in the Faraday rotation direction from the first Faraday element; fixed magnetic field applying means for magnetically saturating the first and second Faraday elements; variable magnetic field applying means for changing the Faraday rotation angle on the first Faraday element; and an optical filter functioning part having a wavelength-dependent loss which is reverse in sign to a wavelength-dependent loss to be caused by the above-described structure.

In this manner, the wavelength dependence, as an optical attenuator, can be reduced by adding an optical filter functioning part reverse in characteristic to a wavelength-dependent loss as optical attenuator to be caused due to a wavelength characteristic of Faraday rotation angle possessed by the Faraday element.

The first and second Faraday elements are such that, provided that a maximum rotation angle by the first Faraday element is $\theta_{1max}$, a minimum rotation angle is $\theta_{1min}$ and a rotation angle by the second Faraday element is $\theta_2$, then the following relationship is satisfied:

$|\theta_{1min}| \leq |\theta_2| \leq |\theta_{1max}|$.

It is preferred that, provided that a rotation angle by the first Faraday element in a crossed-Nicols state is $\theta_{1k}$, a polarizer optical-axis angle $\theta_f$ from an electromagnet magnetic field direction by the variable magnetic field applying means is:

$\theta_f \approx \theta_{1k}/2 + n\pi/2$ (where $n=0, 1$).

A high attenuation characteristic is obtained by providing, with the $\theta_f$, an orientation in which there is no affection of a Cotton-Mouton effect, i.e. a direction of a polarization plane of incidence on the first Faraday element.

The polarizer and the analyzer preferably use wedge-shaped birefringent plates. When an optical axis of the analyzer is 0–90 degrees from an orientation of an optical axis of the polarizer as viewed in a rotation direction on the first Faraday element, it is possible to return the polarization plane to the crossed-Nicols state in order to use the second Faraday element.

When the second Faraday element is positioned in a manner so as to be sandwiched by the polarizer and the first Faraday element, an optical axis $\theta_f$ of the polarizer is set as:

$$\theta_f = \theta_{1k}/2 + 5 | \theta_2 | + n\pi/2 \text{ (where } n=0, 1)$$

This is because, in case there is the second Faraday element positioned next to the polarizer, the polarization plane of incidence on the first Faraday element positioned rear to that is different by $\theta_2$.

There is provided, as another embodiment of the present invention, a structure the Faraday rotation angle varying device comprises: a first Faraday element, a second Faraday element which is different in Faraday rotation direction from the first Faraday element, and a third Faraday element which is the same in Faraday rotation direction as the first Faraday element, arranged in the order from first to third; fixed magnetic field applying means for magnetically saturating all of the Faraday elements; and variable magnetic field applying means for changing a Faraday rotation angle on the first and third Faraday elements. The Faraday rotation angle varying device also includes an optical filter functioning part having a wavelength-dependent loss which is reverse in sign to a wavelength-dependent loss to be caused by the above-described structure. The first and third Faraday elements are desirably the same one.

It is preferred that, for a light incident in a forward direction or a reverse direction, provided that a rotation angle by the second Faraday element in a crossed-Nicols state is $\theta_{1k}$, a polarizer optical axis angle $\theta_f$ from an electromagnet magnetic field direction by the variable magnetic field applying means is:

$$\theta_f = \theta_{1k}/2 + n\pi/2 \text{ (where } n=0, 1)$$

It is favorable that the polarizer and the analyzer use wedge-shaped birefringent plates, and that the angle which is defined by the optical axes of the polarizer and analyzer is 90 degrees.

In these embodiments of the present invention, the second Faraday element preferably has a high coercive force to exhibit a property almost not changing in rotation angle against a variable magnetic field. This is because size reduction is made possible. Incidentally, in case the second Faraday element is set up to be distant from the first (and third) Faraday element so as not to be exerted by a variable magnetic field, a high coercive force is not necessarily required.

The optical filter functioning part may be formed on an optical surface of any at least one or more of the polarizer, the analyzer and the first and second Faraday elements. Alternatively, the optical filter functioning part may be separately formed on a glass substrate and inserted in at least one point or more of spaces at an inside or outside of an arrangement of the polarizer, the Faraday element and the analyzer. In the case of a fiber input/output type, the optical filter functioning part may be formed on an optical surface of at least one or more of the both fiber ends, the both lenses, the polarizer, the Faraday element and the analyzer. Alternatively, the optical filter functioning part may be separately formed on a glass substrate and inserted in at least one point or more of spaces between the fiber ends, the lenses, the polarizer, the Faraday element and the analyzer. Such an optical filter functioning part is designed and made to develop a predetermined characteristic, for example, on a dielectric multi-layer film.

The wavelength-dependent loss gradient on the optical filter functioning part is determined by taking into consideration a maximum/minimum wavelength-dependent loss gradient in the absence of the optical filter functioning part. However, basically, the optical filter functioning part is satisfactory if falling between the maximum and minimum wavelength-dependent loss gradients in the absence of the optical filter functioning part. More preferably, provided that a maximum wavelength-dependent loss gradient in an optical attenuator, in the absence of an optical filter functioning part, is WDL1 and a minimum wavelength-dependent loss gradient is WDL2, then a wavelength-dependent loss gradient X of the optical filter functioning part is set as:

$$X \approx -(WDL1+WDL2)/2.$$

In the case where the wavelength-dependent loss may be fully reduced only within an arbitrary service attenuation range, the setting of the optical filter functioning part is made such that, provided that a maximum wavelength-dependent loss gradient in an arbitrary service range in an optical attenuator, in the absence of an optical filter functioning part, is WDL3 and a minimum wavelength-dependent loss gradient is WDL4, then a wavelength-dependent loss gradient X of the optical filter functioning part is:

$$X \approx -(WDL3+WDL4)/2.$$

By thus setting the optical filter functioning part with a wavelength-dependent loss, it is possible to more effectively reduce the wavelength-dependent loss as a variable optical attenuator.

BRIEF DESCRIPTION OF THE DRAWINGS

FIG. 1 is an explanatory view showing an embodiment of an optical attenuator according to the present invention.

FIG. 2 is an explanatory view showing another embodiment of an optical attenuator which is built with an optical filter functioning part.

FIG. 8 is an explanatory view showing another embodiment of an optical attenuator according to the present invention.

FIG. 9 is an explanatory view showing still another embodiment of an optical attenuator according to the present invention.

DETAILED DESCRIPTION OF THE INVENTION

Figure 3:
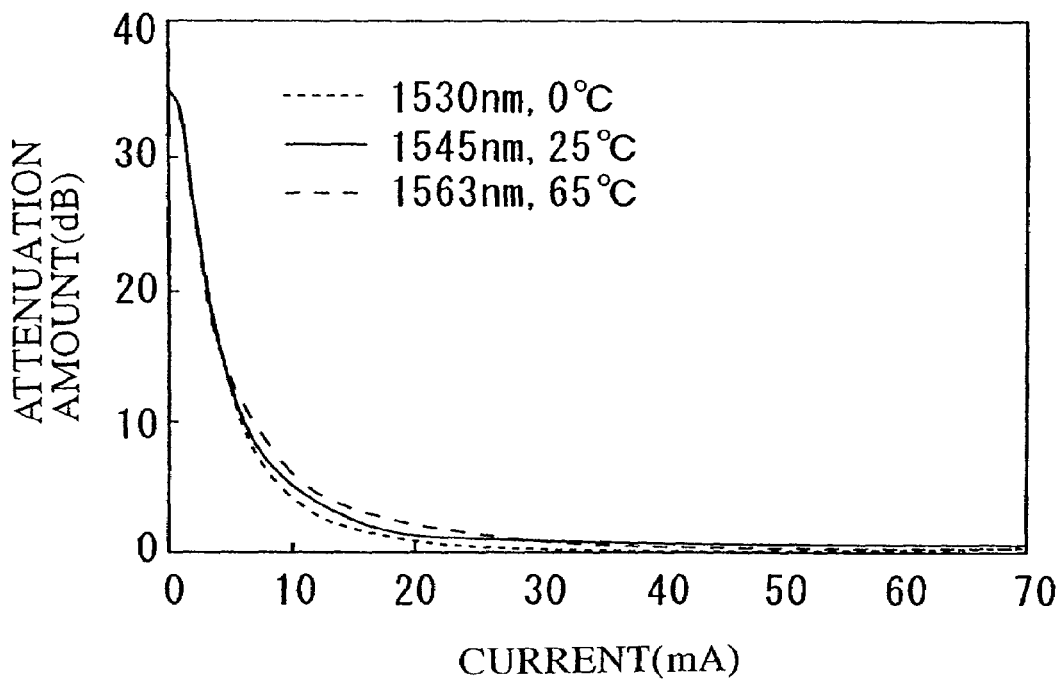
FIG. 3 is a graph showing a temperature characteristic.

FIG. 1 illustrates an embodiment of an optical attenuator according to the present invention. A Faraday rotation device 22 is arranged between an input fiber collimator 14 and an output fiber collimator 20. The input fiber collimator 14 has an input fiber 11, which is fitted in a ferrule 10, and a collimating lens 12, and the output fiber collimator 20 has an output fiber 17, which is fitted in a ferrule 16, and a collimating lens 18. The Faraday rotation device 22 has two permanent magnets 24, 30 and two Faraday elements 28, 32. As elements of the Faraday rotation device 22, a permanent magnet 24, a polarizer 26, which is formed by a wedge shaped birefringent plate (e.g. rutile crystal), a first Faraday element 28, a second Faraday element 32 that is incorporated in a permanent magnet 30, and an analyzer 34, which is formed by a wedge-shaped birefringent plate (e.g. rutile crystal), are arranged along an optical path in order from an input side to an output side. An electromagnet (variable magnetic field applying means) 36 is structurally provided so as to apply a magnetic field, in a direction which is different from a light ray direction, to the Faraday element 28 which is positioned between both of the permanent magnets 24, 30. The two permanent magnets 24, 30 are both annular and magnetized bipolar axially of the through-holes thereof, which are arranged so as to be directed in the same magnetization direction. Meanwhile, the two Faraday elements 28, 32 are the same in Faraday rotating direction with respect to the same magnetizing direction, which herein use those of the same in characteristic/composition.

The magnetic field by both of the permanent magnets 24, 30 is in a magnitude so as to magnetically saturate both of the Faraday elements 28, 32 in opposite directions. The second Faraday element 32 that is incorporated in the permanent magnet 30 is applied by only a magnetic field which is due to the permanent magnet 30. The first Faraday element 28 which is positioned between both of the permanent magnets 24, 30 is applied by a resultant one of a fixed magnetic field in a light ray direction due to both of the permanent magnets 24, 30 and a variable magnetic field in a different direction from the light ray direction due to the electromagnet 36. By varying the resultant magnetic field, the first Faraday element 28 changes in Faraday rotation angle while the second Faraday element 32 is nearly constant in Faraday rotation angle. Accordingly, this results in a change in the total Faraday rotation angle of the Faraday elements 28, 32, and the wavelength and temperature coefficient are offset by both of the Faraday elements 28, 32.

The operation principle of the optical attenuator is basically the same as the conventional optical attenuator using birefringent crystal plates as a polarizer and analyzer. For example, in the case where the polarizer 26 and the analyzer 34 are arranged such that the optical axes of the both birefringent crystal plates are parallel with each other, the operation is as follows. The light, which has exited the input fiber 11 and turned into a collimated beam by the collimating lens 12, is separated by the polarizer 26 into normal light and abnormal light. The normal light and the abnormal light have polarizing directions which are perpendicular to each other. Each of the normal and abnormal light, upon passing the Faraday rotation angle varying device 22, rotates in a polarizing direction depending on a magnitude of magnetization in a direction which is parallel with an optical path, thus being further separated into normal light and abnormal light by the analyzer 34. The normal light and abnormal light, in a part which has exited the analyzer 34, are parallel with each other and are coupled to the output fiber 17 by the collimating lens 18. However, because the normal light and the abnormal light, in the remaining part which has exited the analyzer 34, are not parallel but spread, such remaining part, even if they have passed the lens 18, are not coupled to the output fiber 17.

When the magnetic field which is applied by the electromagnet 36 is zero, the Faraday rotation angle is 90 degrees (magnetization is parallel with the light ray direction). Because the normal light having exited the polarizer 26 travels as an abnormal light out of the analyzer 34 while the abnormal light having exited the polarizer 26 travels as a normal light out of the analyzer 34, the normal and abnormal light are not coupled to the output fiber 17 even if passing the collimating lens 18. On the contrary, when the magnetic field which is applied by the electromagnet 36 is sufficiently great, the Faraday rotation angle nears zero degrees. Because the normal light having exited the polarizer 26 travels, nearly as it is, as a normal light out of the analyzer 34 while the abnormal light having exited the polarizer 26 travels, nearly as it is, as an abnormal light out of the analyzer 34, both of the normal and abnormal light are parallel and are all coupled to the optical fiber 17 by the collimating lens 18. In this manner, in accordance with the intensity of the magnetic field which is applied by the electromagnet 36, the magnetization on the first Faraday element 28 rotates and the Faraday rotation angle changes in a range from approximately 90 degrees to approximately 0 degrees. Accordingly, depending upon the intensity of the magnetic field which is applied by the electromagnet 36, the amount of the light to be coupled to the output fiber 17 differs, thus functioning as a variable-type optical attenuator.

It is noted that, actually, the Faraday rotation angle is given to be 90 degrees or greater, when the magnetization on the first Faraday element 38 directs in the light ray direction, and is changed within an angular range smaller than 90 degrees, for the convenience of the power to be applied to the electromagnet. For example, the Faraday rotation angle, when the magnetization directs in the light ray direction, becomes 96 degrees, and the magnetic field of the electromagnet 36 is applied to decrease the Faraday rotation angle to 15 degrees. In this case, when the angle defined by the optical axes of the both birefringent crystals as the polarizer and analyzer is set to 105 degrees, a crossed-Nicols state is entered at a Faraday rotation angle of 15 degrees, thereby obtaining a great attenuation amount. Accordingly, even with such a case, the operation principle is similar to the above.

FIG. 2 is an explanatory view showing another embodiment of an optical attenuator according to the present invention. Because the basic structure of the optical attenuator shown in FIG. 2 is similar to the optical attenuator shown in FIG. 1, the corresponding members are described with the same reference numerals and the descriptions thereof are omitted for a simplified explanation. In this embodiment, there is provided an optical filter functioning part 38 having a wavelength-dependent loss which is reverse in sign to a wavelength-dependent loss to be caused by the Faraday rotation device. This optical filter functioning part 38 is, for example, an optical filter having a desired characteristic optical filter film which is formed of a dielectric multi-layer film on a glass substrate.

Provided that, for example, the optical attenuator, in the absence of an optical filter functioning part, has a maximum wavelength-dependent loss gradient WDL1 and a minimum wavelength-dependent loss gradient WDL2, the characteristic of the optical filter functioning part 38 is set such that the optical filter functioning part has a wavelength-dependent loss gradient X as:

$$X \approx -(WDL1+WDL2)/2.$$

Alternatively, provided that, for example, the optical attenuator, in the absence of an optical filter functioning part, has a maximum wavelength-dependent loss gradient WDL3 and a minimum wavelength-dependent loss gradient WDL4 in an arbitrary service attenuation range, the optical filter functioning part 38 is set such that the optical filter functioning part has a wavelength-dependent loss gradient X as:

$$X \approx -(WDL3+WDL4)/2.$$

This can reduce wavelength-dependent loss.

Herein, the Faraday elements 28, 32 used a magnetic garnet single-crystal film having a composition which is expressed as $Tb_{1.00}Y_{0.65}Bi_{1.35}Fe_{4.05}Ga_{0.95}O_{12}$ and was grown on a non-magnetic garnet single-crystal substrate by the LPE (liquid phase epitaxial) process. Note that the magnetic garnet single-crystal film is removed from the non-magnetic garnet single-crystal substrate and is grounded at both surfaces to a predetermined thickness.

In the case of $\theta_{1max}=-\theta_2$, provided that the maximum rotation angle by the first Faraday element 28 which is positioned between the both permanent magnets 24, 30 is $\theta_{1max}$ and the rotation angle by the second Faraday element 32 which is incorporated in the permanent magnet 30 is $\theta_2$, and provided that, when the rotation angle on the first Faraday element 28 is 96 degrees at an electromagnet magnetic field of zero, the rotation angle on the second Faraday element 32 is −96 degrees, the angle which is defined by the optical axes of the polarizer 26 and analyzer 34 is 90 degrees, and the optical filter characteristic is given as the above $X \approx -(WDL1+WDL2)/2$ or $X \approx -(WDL3+WDL4)/2$, when the Faraday rotation angle wavelength coefficient and the temperature coefficient of the first Faraday element 28 and second Faraday element 32 are reverse in sign, then an optical attenuator having a temperature·wavelength-dependent characteristic of zero in a high attenuation range can be realized at an electromagnet magnetic field of zero (current: 0 mA). Furthermore, the wavelength dependence can be reduced in an arbitrary service attenuation range by the optical filter characteristic.

Figure 4:
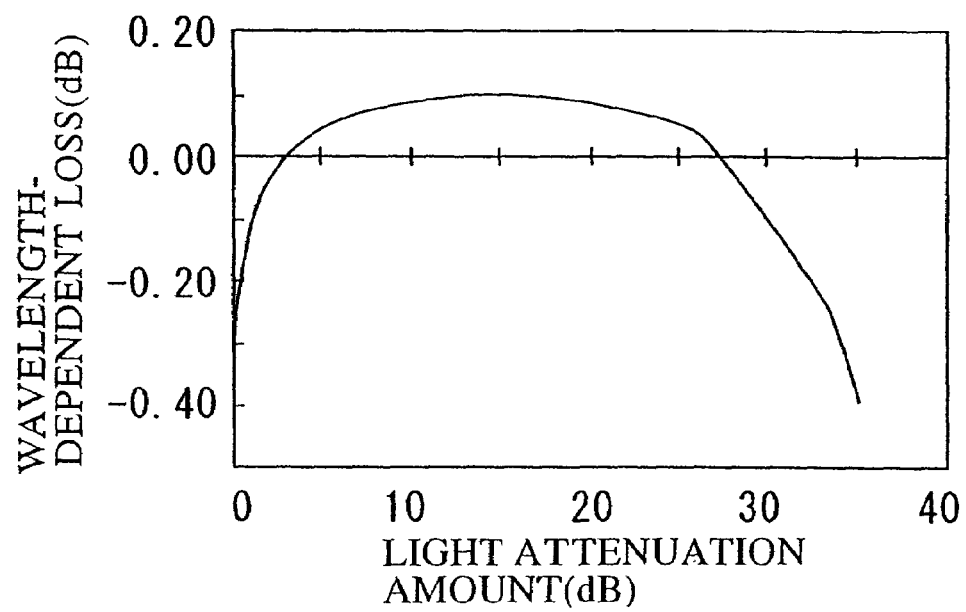
FIG. 4 is a graph showing a wavelength dependence.

FIG. 3 shows the temperature characteristic, while FIG. 4 shows the wavelength dependence thereof. These are for the case when the wavelength-dependent loss gradient is −0.4 dB in the optical attenuator in the absence of an optical filter functioning part. The wavelength-dependent loss is ±0.1 dB at an attenuation amount of between 2 dB and 30 dB.

Meanwhile, in the case of $-\theta_2=\theta_1$ ($\theta_1$: the rotation angle due to the first Faraday element 28 which is positioned between the permanent magnets 24, 30, $\theta_2$: the rotation angle due to the second Faraday element 32 which is incorporated in the permanent magnet 30), the wavelength coefficients (degrees/nm) of the both are opposite in sign and hence the Faraday rotation angle wavelength dependence is offset. Thus, a point where the wavelength dependence is zero is obtained. The point of zero can be determined at an arbitrary attenuation amount by providing $\theta_2$ within a range satisfying $$|\theta_{1min}| \leq |\theta_2| \leq |\theta_{1max}|$$

and adjusting the angle which is defined by the polarizer and analyzer optical axes.

Figure 5A:
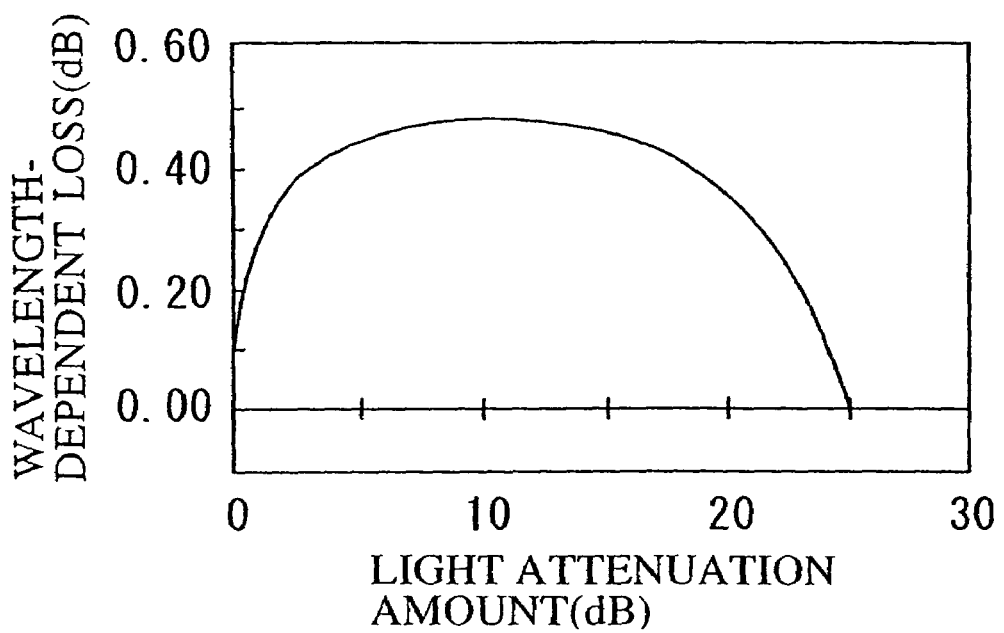
FIGS. 5A and 5B are graphs showing wavelength dependences.
Figure 5B:
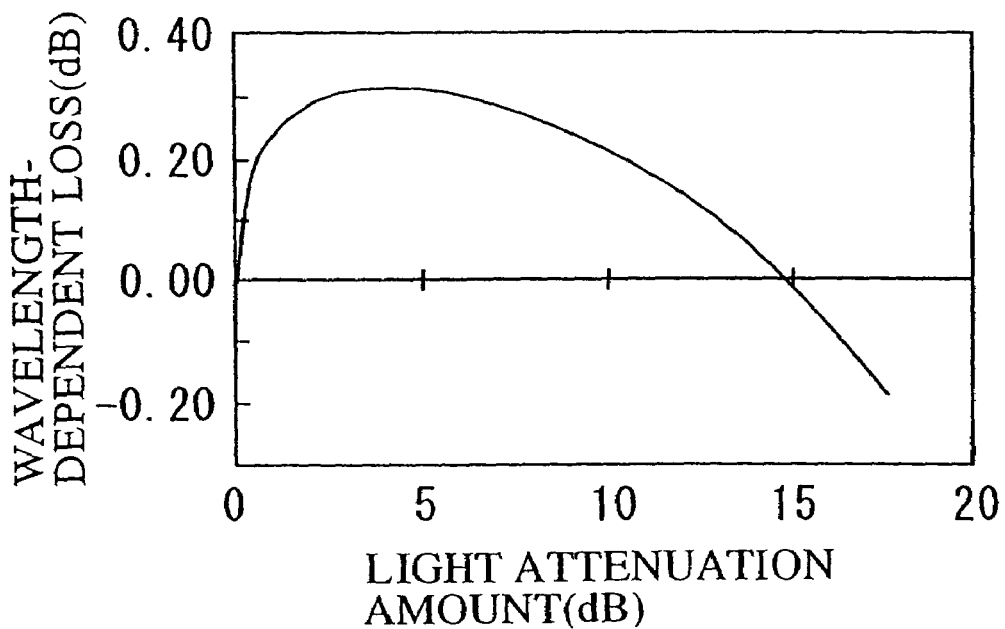

For example, in the case where the rotation angle on the first Faraday element 28 is 96 degrees, the rotation angle on the second Faraday element 32 is −15 degrees and the angle which is defined by the polarizer and analyzer optical axes is 90 degrees at an electromagnet magnetic field of zero, a crossed-Nicols state is entered at a rotation angle of 15 degrees on the first Faraday element wherein the attenuation amount reaches the maximum (attenuation amount: 25 dB). The wavelength dependence is offset by the second Faraday element (see FIG. 5A). In the case where the angle which is defined by the optical axes of the polarizer and analyzer is 80 degrees under the same condition, the point the wavelength dependence is offset lies at around an attenuation amount of 15 dB when the second Faraday element is at a rotation angle of 15 degrees (a crossed-Nicols state is not reached) (see FIG. 5B). By adjusting the Faraday rotation angle $\theta_2$ on the second Faraday element and the angle which is defined by the polarizer and analyzer optical axes, it is possible to provide a region where the wavelength-dependent loss is flat. Thus, the optical filter characteristic can be utilized.

Furthermore, a high attenuation characteristic is obtained by setting the orientation in which there is no affection of the Cotton-Mouton effect, i.e. the orientation of a polarization plane of incidence on the first Faraday element (an optical axis angle of the polarizer with respect to the electromagnet magnetic field direction) $\theta_f$ as in the following equation.

$$\theta_f \approx -\theta_{1k}/2 + n\pi/2 \text{ (where } n=0, 1)$$

($\theta_{1k}$ is the rotation angle by the first Faraday element in a crossed-Nicols state)

Figure 6:
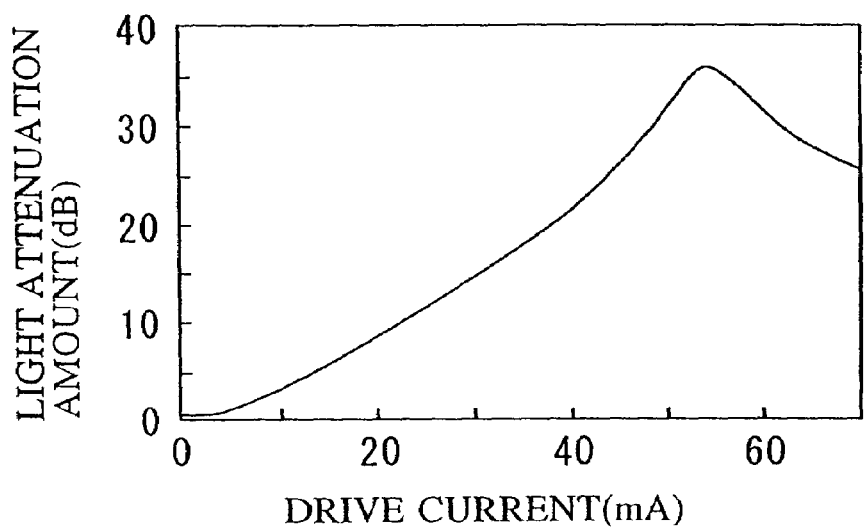
FIG. 6 is a graph showing an attenuation characteristic.
Figure 7:
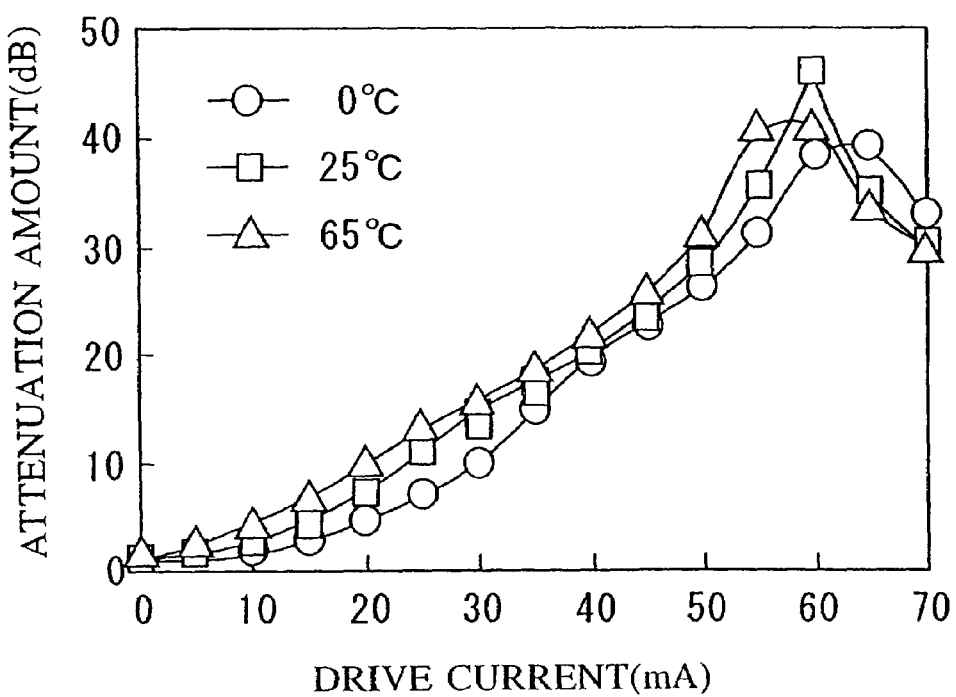
FIG. 7 is a graph showing a temperature characteristic.

For example, in case the Faraday rotation angle by the first Faraday element is 96 degrees, the Faraday rotation angle by the second Faraday element is −15 degrees and the angle which is defined by the polarizer and analyzer optical axes is 90 degrees, then $\theta_{1k}=15$ degrees and $\theta_f=-7.5$ degrees+$n\pi/2$. The attenuation characteristic (an example at 1545 nm, 25° C.) in this structure is shown in FIG. 6, and the temperature characteristic (an example at 1545 nm) is shown in FIG. 7.

FIG. 8 is an explanatory view showing another embodiment of an optical attenuator according to the present invention. A Faraday rotation device 22 is arranged between an input fiber collimator 14 and an output fiber collimator 20. The input fiber collimator 20 has an input fiber 11, which is fitted in a ferrule 10, and a collimating lens 12, and the output fiber collimator 20 has an output fiber 17, which is fitted in a Ferrule 16, and a collimating lens 18. Herein, the Faraday rotation device 22 as shown in FIG. 8 has two permanent magnets 24, 30 and two Faraday elements 32, 28. As elements of the Faraday rotation device 22, a polarizer 26, which is formed by a wedge-shaped birefringent plate (e.g. rutile crystal), a Faraday element 32, which is incorporated in the permanent magnet 24, a Faraday element 28, an analyzer 34, which is formed by a wedge-shaped birefringent plate (e.g. rutile crystal), and the permanent magnet 30, are arranged on an optical path in order from an input side to an output side. An electromagnet (variable magnetic field applying means) 36 is provided so as to apply a magnetic field, in a direction which is different from a light ray direction, to the Faraday element 28 which is positioned between both of the permanent magnets 24, 30. The two permanent magnets 24, 30 are both annular and magnetized bipolar axially of the through-holes thereof, which are arranged so as to be directed in the same magnetization direction.

FIG. 9 is an explanatory view showing still another embodiment of an optical attenuator according to the present invention. A Faraday rotation device 22 is arranged between an input fiber collimator 14 and an output fiber collimator 20. The input fiber collimator 14 has an input fiber 11, which is fitted in a ferrule 10, and a collimating lens 12, and the output fiber collimator 20 has an output fiber 17, which is fitted in a ferrule 16, and a collimating lens 18. Herein, the Faraday rotation device 22 as shown in FIG. 9 has two permanent magnets 24, 30 and three Faraday elements 32, 28, 52. As elements of the Faraday rotation device, a polarizer 26, which is formed by a wedge-shaped birefringent plate (e.g. rutile crystal), a Faraday element 32, which is incorporated in the permanent magnet 24, the Faraday element 28, the Faraday element 52, which is incorporated in the permanent magnet 30 and an analyzer 34, which is formed by a wedge-shaped birefringent plate (e.g. rutile crystal), are arranged along an optical path in order from an input side to an output side. An electromagnet (variable magnetic field applying means) 36 is structurally provided so as to apply a magnetic field, in a direction which is different from a light ray direction, to the Faraday element 28 which is positioned between both of the permanent magnets 24, 30. The two permanent magnets 24, 30 are both annular and magnetized axially of the through-holes thereof, which are arranged so as to be directed in the same magnetization direction. In this embodiment, the permanent magnets 24, 30 are provided so as to be separated into two in consideration of a thickness of the Faraday element 32, 52 which is incorporated in the permanent magnet, respectively.

The respective Faraday element 32, 52 incorporated in the permanent magnet 24, 30 serves as a compensation film in the conventional art. In case this is positioned on the input side as in the embodiment shown in the above FIGS. 8 and 9, there is a need to change the position (or angle) of the optical axis of the polarizer 26 by the corresponding amount. Provided that the rotation angle by the Faraday element which is positioned between the permanent magnets in a crossed-Nicols state is $\theta_{1k}$, the polarizer optical axis angle $\theta_f$ with respect to the electromagnet magnetic field is preferably given as:

$$\theta_f = -\theta_{1k}/2 - \theta_2 + n\pi/2 \text{ (where } n=0, 1).$$

This is because there is a difference, in the polarization plane of incidence on the Faraday element which is positioned between the permanent magnets, in the cases where there is a presence and absence of a Faraday element which is incorporated in a permanent magnet at a location between the Faraday element and polarizer which is positioned between the permanent magnet. For example, in case the Faraday rotation angle on the Faraday element which is positioned between the permanent magnets is 96 degrees, the Faraday rotation angle on the Faraday element which is incorporated in the permanent magnet that is situated in an input side is −15 degrees and the angle that is defined by the polarizer and analyzer optical axes is 90 degrees, then $\theta_{1k}=15$ degrees and $\theta_f=-7.5$ degrees$+n\pi/2$.

Meanwhile, although the embodiments shown in FIGS. 8 and 9 are not provided with an optical filter functioning part, it is possible to provide, at an arbitrary position, an optical filter functioning part having a wavelength-dependent loss that is reverse in sign to a wavelength-dependent loss to be caused by the Faraday rotation device as in FIG. 2. Such an optical filter functioning part can reduce the wavelength-dependent loss.

In the foregoing embodiments (FIGS. 1, 2, 8 and 9) of the present invention, a plurality of permanent magnets are arranged so as to be directed in the same magnetization direction along the optical path. Part of the Faraday elements is accommodated in the through-hole of the permanent magnet while the remaining Faraday elements are arranged between the permanent magnets. Consequently, the magnetic fields can be applied in opposite directions to the part of the Faraday elements which is accommodated in the through-hole of the permanent magnet and the remaining Faraday elements. Despite using the Faraday elements having the same Faraday rotating direction with respect to the same magnetic field direction, it is possible to provide a function for offsetting the wavelength and temperature coefficient of Faraday rotation angle. In addition to the reduction effect of wavelength-dependent loss, there is a reduction effect of temperature-dependent loss. Namely, the Faraday elements may be of the same composition and the same characteristic. There arises a merit in eliminating the necessity for developing a new composition of garnet single crystal serving as a compensation film which is suited for the characteristic of the main Faraday element. Thus, the economical effect is extremely great.

In the present invention, because the effect of offsetting the wavelength and temperature coefficient of Faraday rotation angle is effective particularly in a region in which attenuation that is taken is great, there is a great characteristic improving effect in the application as an optical attenuator. Furthermore, providing an optical filter functioning part makes it possible to greatly reduce the wavelength-dependent loss in an arbitrary light attenuation range.

From these facts, the optical attenuator of the present invention is especially effective for a WDM (wavelength division multiplex) transmission system using EDFAs (erbium-added optical fiber amplifiers) in multiple stages.

Figure 10:
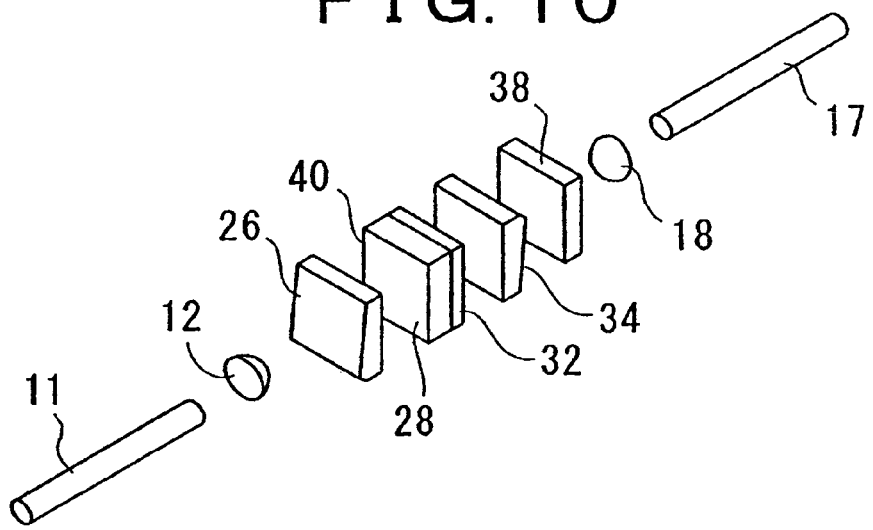
FIGS. 10 and 11 are explanatory views showing an embodiment of a variable optical attenuator according to the present invention.
Figure 11:
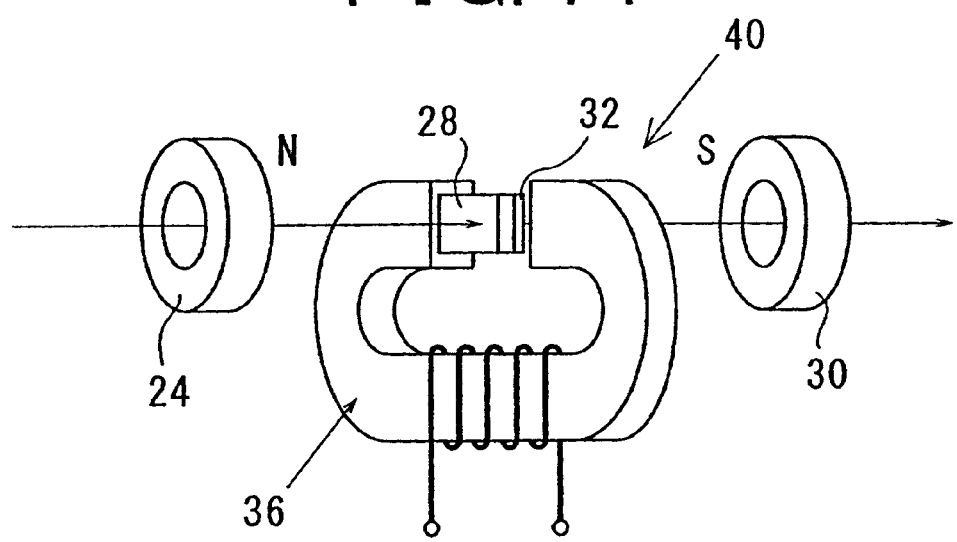

With reference to FIGS. 10 and 11, an embodiment of a variable optical attenuator of the present invention will now be described. Note that FIG. 10 omits the magnetic-field applying means for the Faraday rotation angle varying device for the purpose of readily understanding the arrangement state of the optical parts. Concerning the detailed structure of the Faraday rotation angle varying device, one example is shown in FIG. 11.

The variable optical attenuator, as shown in FIG. 10, has an input fiber 11, a lens 12, a polarizer 26, a Faraday rotation angle varying device 40, an analyzer 34, a lens 18, and an output fiber 17. These constituent elements are arranged in order. Herein, the polarizer 26 and the analyzer 38 are both formed by wedge-shaped birefringent crystal plates (e.g., rutil crystals). The Faraday rotation angle varying device 40 comprises a first Faraday element 28 and second Faraday element 32 which are positioned on an optical path, fixed magnetic-field applying means (one pair of permanent magnets 24, 30) for magnetically saturating the first and second Faraday elements 28 and 32, and variable magnetic-field applying means (electromagnet 36) for changing the Faraday rotation angle on the first Faraday element 28. Incidentally, the second Faraday element 32 is different with respect to the rotation direction and the sign of Faraday-rotation-angle wavelength coefficient of the first Faraday element 28.

As shown in the drawings, the first Faraday element 28 and the second Faraday element 32 are built in a magnetic field which is parallel with a light ray direction, due to the permanent magnet 24, 30, and in a magnetic field which is orthogonal to the light ray direction, due to the electromagnet 36. In case the second Faraday element 32 uses a material that is great in vertical magnetic anisotropy or a high coercive material, there is no special problem in arrangement at a position where both fixed and variable magnetic fields are applied (where the vertical magnetic anisotropy is small or the coercive force is low, arrangement may be at a position where only the fixed magnetic field is to be applied). When the magnetic field due to the electromagnet 36 is zero, the first Faraday element 24 and the second Faraday element 32 have a magnetization direction in the light ray direction. When a magnetic field of the electromagnet 36 is applied, the magnetization direction on the first Faraday element 28 rotates, but the magnetization direction on the second Faraday element 32 does not rotate. Consequently, the first Faraday element 28 changes in its Faraday rotation angle due to a change in the resultant magnetic field of the fixed magnetic field of the permanent magnet 24, 30 and the variable magnetic field of the electromagnet 36. However, there is no change in the Faraday rotation angle on the second Faraday element 32. Eventually, the Faraday rotation angle of the Faraday rotation angle varying device 40 changes depending on a change of Faraday rotation angle on the first Faraday element 28. The wavelength dependence of Faraday rotation angle is decreased by the second Faraday element 32.

The present invention provides an optical filter functioning part having at least a wavelength-dependent loss that is reverse in sign to the wavelength-dependent loss to be caused by the above-described structure. In this embodiment, an optical filter 38 is inserted between the analyzer 18 and the lens 20. The optical filter 38 includes an optical filter film having a desired characteristic that is formed by a dielectric multi-layer film on a glass substrate.

Such an optical filter, on its principle, may be inserted at any point between a fiber end, a lens, a polarizer, an analyzer and the first and second Faraday elements, or separately to a plurality of points. The optical filter functioning part may be of such a structure so as to have optical filter films that are formed on at least one or more of optical surfaces of the fiber end, the lens, the polarizer, the analyzer and the first and second Faraday elements, instead of being a separate member as in the above-described optical filter. Making an optical filter as a separate member is rather preferred with regard to easier preparation and management of parts during assembling and hence high freedom in fabrication.

Figure 12:
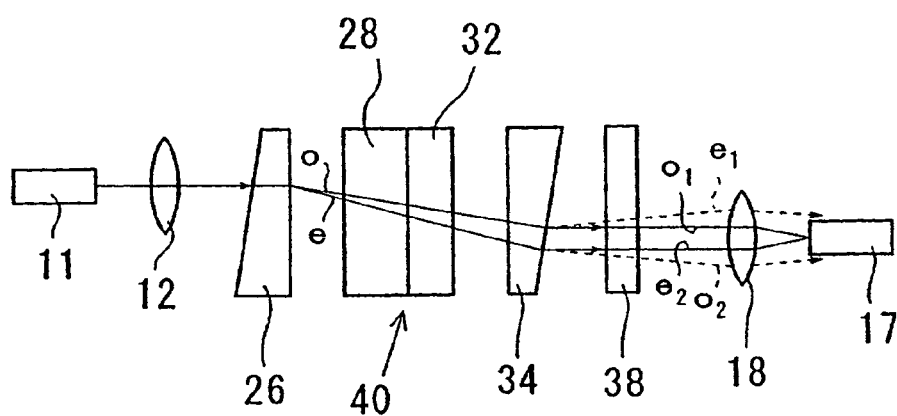
FIG. 12 is an operation explanatory view of the variable optical attenuator shown in FIGS. 10 and 11.

The operation principle of the variable optical attenuator will now be explained with reference to FIG. 12. For example, in the case the polarizer 26 and the analyzer 34 are arranged such that the optical axes of their birefringent crystal plates are parallel with each other, the operation is as follows. Namely, the light, having exited the input fiber 11 and turned by the lens 12 into a collimated light, is separated into a normal light o and an abnormal light e by the polarizer 26. The normal light o and the abnormal light e are orthogonal in their polarization direction to each other. Each of the normal and abnormal light, upon passing the Faraday rotation angle varying device 40, rotates in polarization direction in accordance with a magnitude of magnetization in a direction that is parallel with the optical axis, thus being separated by the analyzer 34 into a normal light $o_1$ and an abnormal light $e_1$, a normal light $o_2$ and an abnormal light $e_2$. The normal light $o_1$ and the abnormal light $e_2$ which have exited the analyzer 34 are parallel with each other, and are coupled (shown at the solid line) by the lens 18 to the output-sided fiber 17. However, the abnormal light $e_1$ and the normal light $o_2$ which have exited the analyzer 34, are not parallel with each other but are instead spread, and hence, they are not to be coupled (shown at the broken line) to the output-sided fiber 17 even if passing through the lens 18.

When the magnetic field which is applied by the electromagnet 36 is zero, the Faraday rotation angle is 90 degrees (magnetization is parallel with the optical axis). Consequently, the normal light o, having exited the polarizer 26, travels as an abnormal light $e_1$ out of the analyzer 34 while the abnormal light e, having exited the polarizer 26, travels as a normal light $o_2$ out of the analyzer 34. Thus they are not coupled to the output-sided fiber 17 even if passing through the lens 18. On the contrary, when the magnetic field which is applied by the electromagnet 36 is fully great, the Faraday rotation angle nears 0 degree. The normal light o having exited the polarizer 26, almost in its major part, travels as a normal light $o_2$ out of the analyzer 34 while the abnormal light e having exited the polarizer 26, almost in its major part, travels as an abnormal light $e_2$ out of the analyzer 34. Thus, both of normal and abnormal light are parallel to each other, and hence, are entirely coupled by the lens 18 to the output-sided fiber 17. In this manner, the magnetization on the first Faraday element 28 rotates in accordance with the intensity of the magnetic field which is applied by the electromagnet 36, whereby the Faraday rotation angle changes within a range from approximately 90 degrees to approximately 0 degrees. Depending upon this, there is a difference in the light amount to be coupled to the output-sided fiber 17. Thus, a variable optical attenuator is obtained.

One example of the composition and physical property of the first Faraday element 28 and second Faraday element 32 is shown below.

[First Faraday Element]

Composition: $Tb_{1.00}Y_{0.65}Bi_{1.35}Fe_{4.05}Ga_{0.95}O_{12}$

Faraday rotation angle at an electromagnet magnetic field of zero: 96 degrees

Wavelength change ratio: −0.15%/nm

[Second Faraday Element]

Composition: $Gd_{1.00}Y_{0.75}Bi_{1.25}Fe_{4.00}Ga_{1.00}O_{12}$

Figure 13:
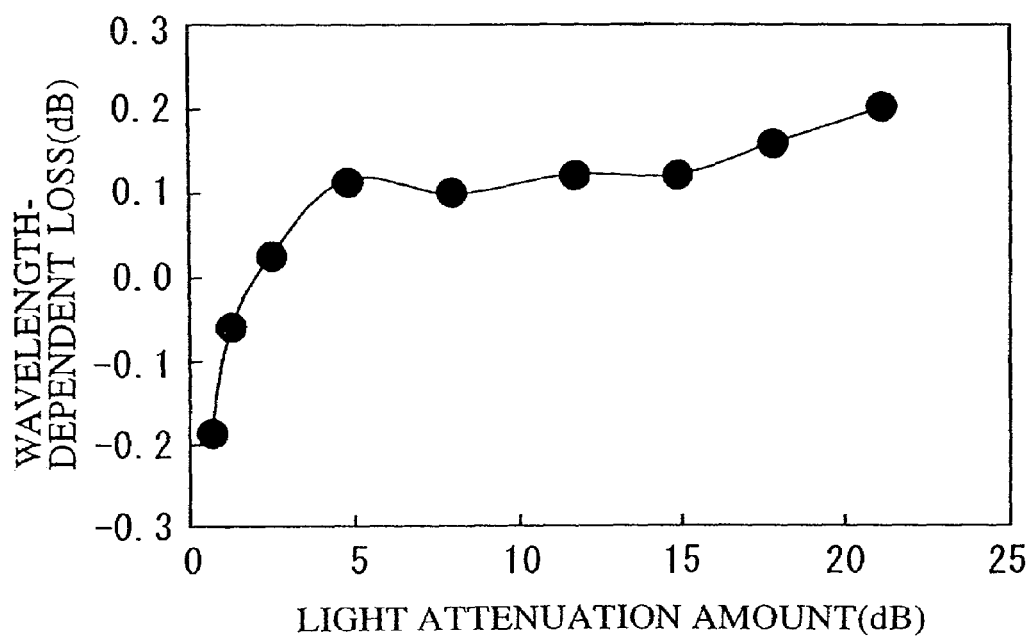
FIG. 13 is a graph showing an example of a wavelength-dependent loss characteristic of the optical attenuator according to the present invention.
Figure 14:
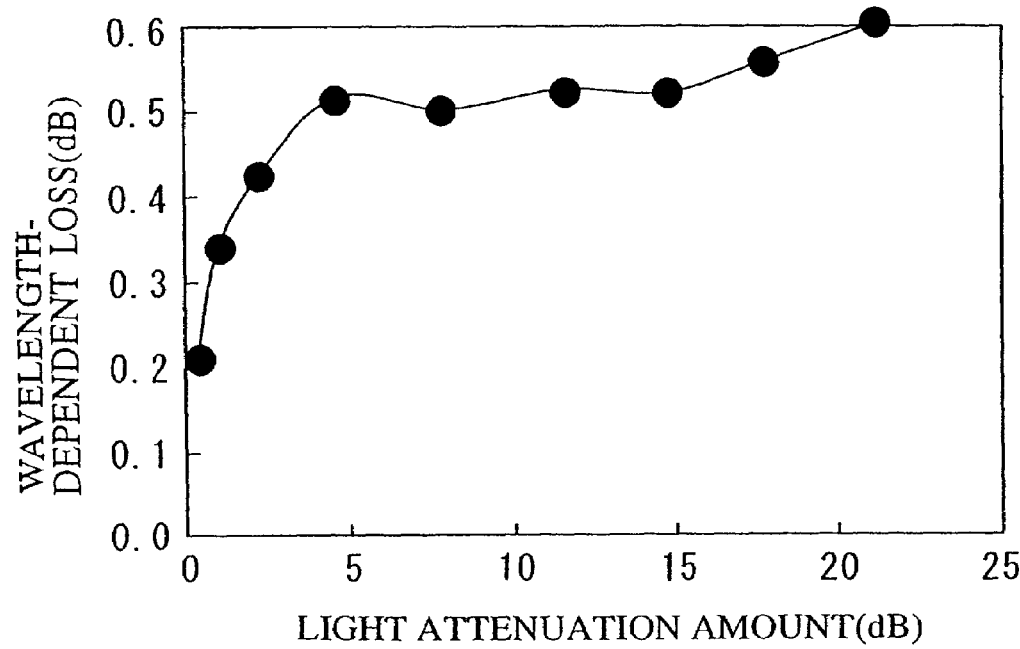
FIG. 14 is a graph showing an example of a wavelength-dependent loss characteristic of an optical attenuator in the absence of an optical filter.

Faraday rotation angle at an electromagnet magnetic field of zero: −19.7 degrees Wavelength change ratio: +0.15%/nm FIG. 13 shows a wavelength characteristic (the relationship of a wavelength-dependent loss against a light attenuation amount) when the angle which is defined by the optical axes of the polarizer and analyzer is 90 degrees, the rotation angle by the first Faraday element is 96 degrees, the rotation angle by the second Faraday element is −15 degrees (in the case where the first Faraday element is given a+rotation angle) and the optical filter has a wavelength characteristic of a −0.4 dB loss gradient. For comparison, FIG. 14 shows a wavelength characteristic in the absence of an optical filter. Note that the wavelength band is 1530–1560 nm. The maximum is 0.6 dB in the absence of an optical filter. On the contrary, by inserting an optical filter, the wavelength band falls within ±0.2 dB over the light attenuation amount of 2–20 dB.

The optical filter is computed and designed from a wavelength characteristic of an optical attenuator in the absence of an optical filter within a service wavelength band. In a concrete method of computation, the setting is made such that, provided that the maximum wavelength-dependent loss gradient of an optical attenuator, in the absence of the optical filter in FIG. 14 is WDL1, the minimum wavelength-dependent loss gradient is WDL2 and the wavelength-dependent loss gradient of the optical filter is X, then the following is obtained:

$$X \approx -(WDL1+WDL2)/2.$$

Figure 15:
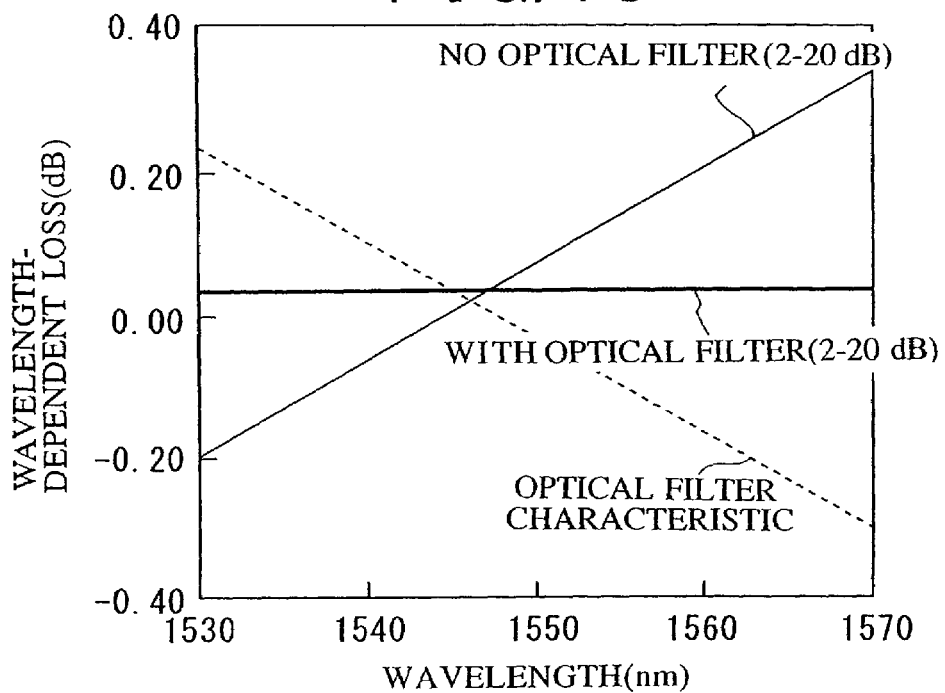
FIG. 15 is an explanatory view of a design technique for the optical filter functioning part.

FIG. 15 shows a relationship between the optical filter for a wavelength, the optical attenuator in the absence of the optical filter (conventional structure) and a wavelength-dependent loss on the optical attenuator in the presence of the optical filter (according to the present invention).

Figure 16:
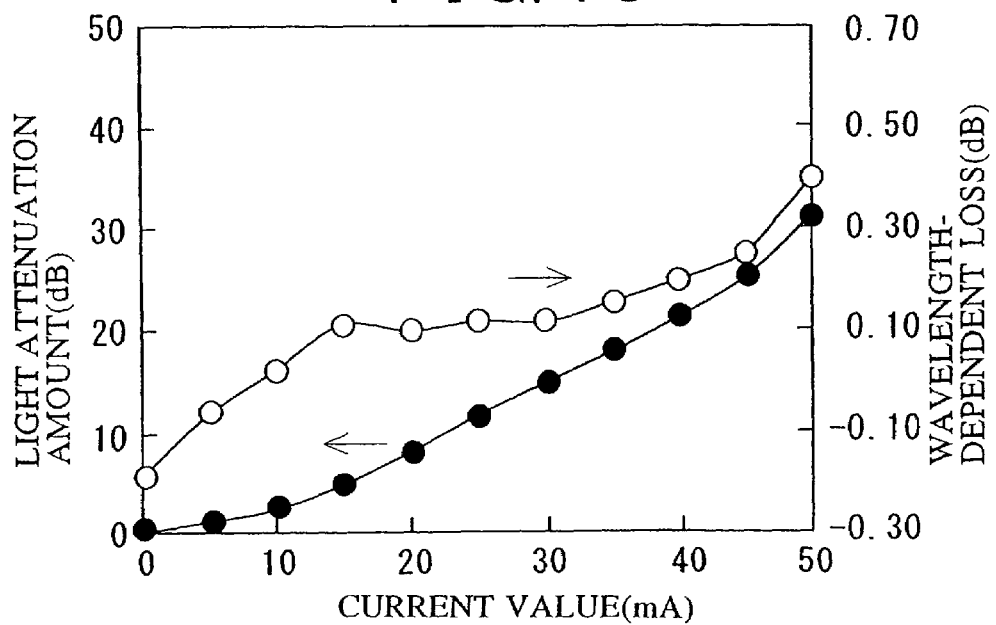
FIG. 16 is a graph showing a characteristic example of the optical attenuator according to the present invention.

Meanwhile, FIG. 16 shows a relationship between a light attenuation amount and a wavelength-dependent loss, against an electromagnet drive current at a wavelength 1545 nm of the optical attenuator having the optical filter.

The rotation angle $\theta_2$ by the second Faraday element is given such that, provided that the maximum rotation angle by the first Faraday element is $\theta_{1max}$ and the minimum rotation angle is $\theta_{1min}$, the relationship is satisfied as:

$$|\theta_{1min}| \leq |\theta_2| \leq |\theta_{1max}|.$$

EXAMPLE 1

For a Case of $\theta_{1max} = -\theta_2$

Figure 17:
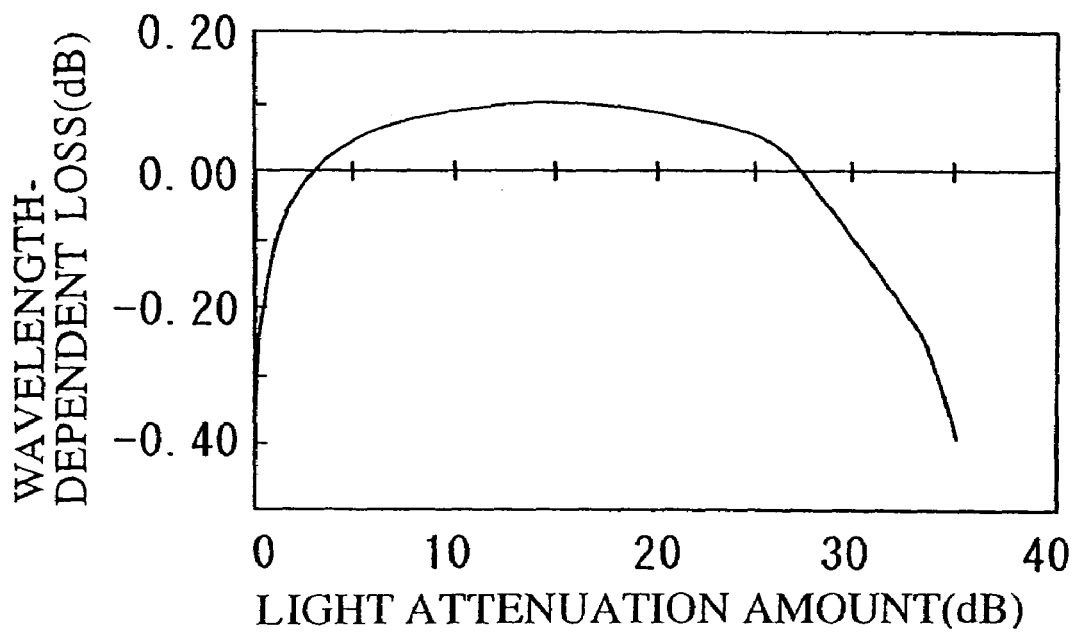
FIG. 17 is a graph showing a relationship between a rotation angle on the first and second Faraday element and a wavelength characteristic.

For example, in case the rotation angle on the first Faraday element 28 at an electromagnet variable magnetic field of zero is 96 degrees, the rotation angle on the second Faraday element is –96 degrees, the angle which is defined by the optical axes of the polarizer and analyzer is 90 degrees, and the optical filter characteristic is given as $X \approx -(WDL1+WDL2)/2$ or $X \approx -(WDL3+WDL4)/2$ as described above, then the sign is opposite between the Faraday rotation angle wavelength coefficient and temperature coefficient of the first Faraday element and second Faraday element. Consequently, it is possible to realize a variable optical attenuator having an extremely reduced temperature•Faraday rotation angle wavelength-dependence characteristic in the high attenuation range, at an electromagnet magnetic field of zero (current: 0 mA). Furthermore, the wavelength-dependent loss can be reduced in an arbitrary service attenuation range by the optical filter characteristic. FIG. 17 shows a wavelength dependence when the wavelength-dependent loss gradient of the optical filter is given to be –0.4 dB. The wavelength-dependent loss is ±0.1 dB for a light attenuation amount of 2–30 dB.

EXAMPLE 2

For a Case of $-\theta_2 = \theta_1$

Figure 18A:
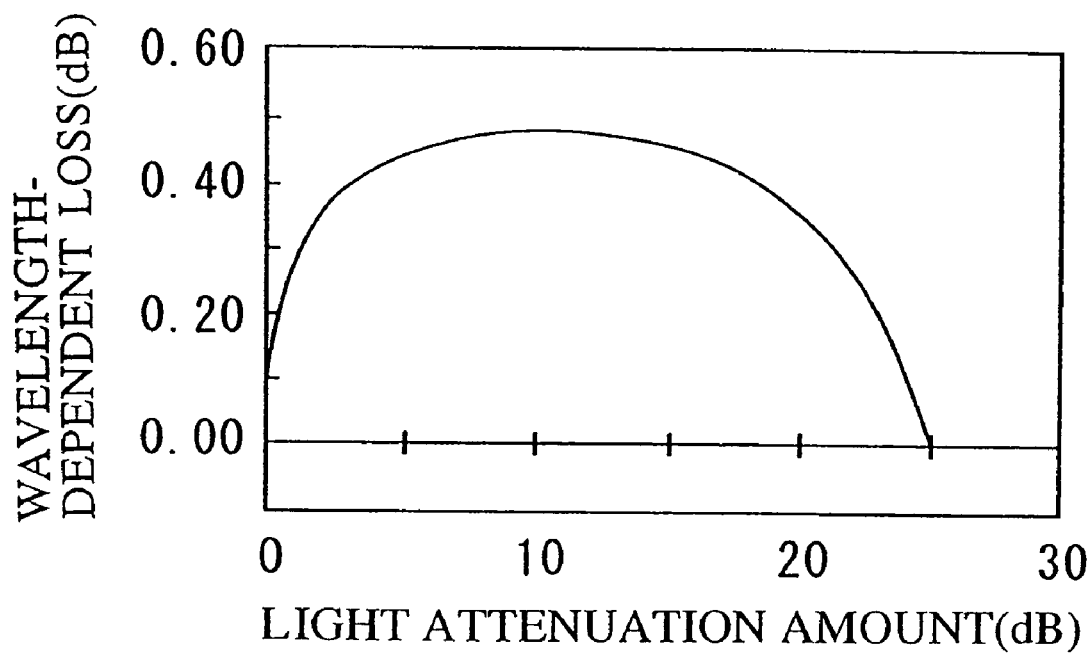
FIGS. 18A and 18B are graphs showing a relationship between a rotation angle on the first and second Faraday element and a wavelength characteristic.
Figure 18B:
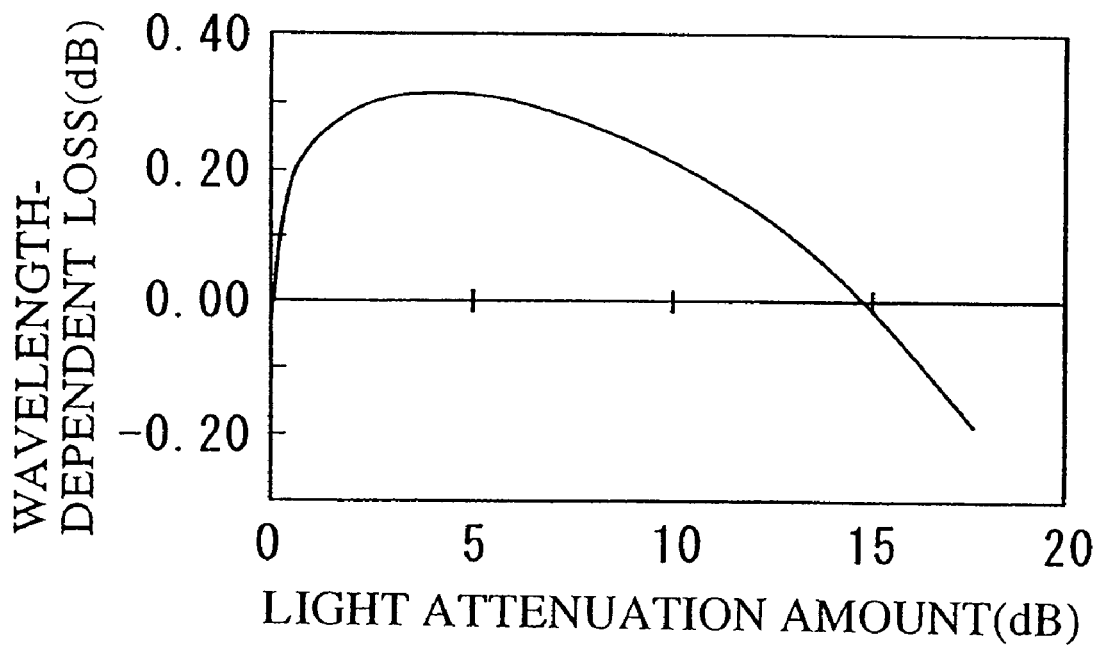

Because the wavelength coefficients of both of the first and second Faraday elements are opposite in sign, the Faraday rotation angle wavelength dependence is offset, thus obtaining a point where the wavelength dependence is zero. This point of zero can be determined at an arbitrary light attenuation amount by arranging $\theta_2$ within a range $|\theta_{1min}| \leq |\theta_2| \leq |\theta_{1max}|$ and adjusting the angle which is defined by the optical axes of the polarizer and analyzer. For example, in the case where the rotation angle on the first Faraday element at an electromagnet magnetic field of zero is 96 degrees, the rotation angle on the second Faraday element is –15 degrees, and the angle which is defined by the optical axes of the polarizer and analyzer is 90 degrees, then a crossed-Nicols state is reached at a rotation angle of first Faraday element of 15 degrees wherein the attenuation amount is at the maximum. The wavelength dependence is offset by the second Faraday element (see FIG. 18A). In the case where the angle which is defined by the optical axes of the polarizer and analizer is given to be 80 degrees under the same condition as the above, the wavelength dependence is offset at a rotation angle of first Faraday element of 15 degrees (a crossed-Nicols state is not reached) wherein the light attenuation amount is at around 15 dB (see FIG. 18B). By adjusting $\theta_2$ and the angle which is defined by the polarizer and analyzer optical axes, it is possible to provide a region where the wavelength-dependent loss is flat. Thus, the optical filter characteristic can be utilized.

When the rotation angle by the first Faraday element in a crossed-Nicols state is $\theta_{1k}$, the polarizer optical axis angle $\theta_f$, with respect to an electromagnet magnetic field direction by the variable magnetic field applying means, is preferably given as:

$$\theta_f \approx -\theta_{1k}/2 + n\pi/2 \text{ (where } n=0, 1\text{)}.$$

Due to this, by setting to the above-described $\theta_f$ the orientation in which there is no affection of the Cotton-Mouton effect, i.e. the orientation of a polarization plane of incidence on the first Faraday element, it is possible to obtain a variable optical attenuator for obtaining a high attenuation characteristic. For example, in the case where the faraday rotation angle on the first Faraday element at an electromagnet magnetic field of zero is 96 degrees and the angle which is defined by the optical axes of the polarizer and analyzer is 105 degrees, then $\theta_{1k}=15$ degrees (i.e. 105 degrees–90 degrees) and $\theta_f \approx -7.5$ degrees+$n\pi/2$.

Figure 19:
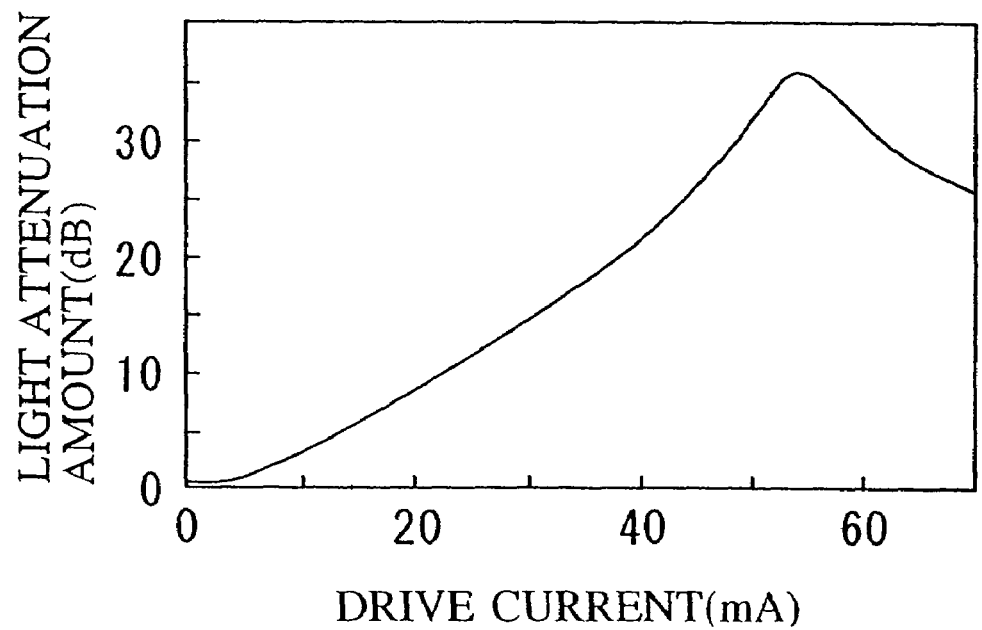
FIG. 19 is an explanatory view of an attenuation characteristic of the optical attenuator.

The optical axis of the analyzer 34 can be given to be 0–90 degrees with respect to the optical-axis orientation of the polarizer 26, as viewed in the rotation direction of the first Faraday element. In the case the Faraday rotation angle is given to be between 0–90 degrees on the optical attenuator having a single Faraday element, it is impossible to obtain, at the same time, a region in which the loss is at the minimum and a region the attenuation is high. This is because the polarization plane cannot be rotated from the analyzer transmission axis when the loss is at the minimum to a crossed-Nicols state. However, the use of a second Faraday element, besides the first Faraday element, makes it possible to return the polarization plane to the crossed-Nicols state even in the above case of providing an optical axis of the analyzer 34 to be between 0–90 degrees. Furthermore, a variable optical attenuator having a high attenuation characteristic is available by setting to the orientation $\theta_f$ in which there is no affection of the Cotton-Mouton effect. For example, FIG. 19 shows an attenuation characteristic in the case where the Faraday rotation angle on the first Faraday element at an electromagnet magnetic field of zero is 96 degrees, the Faraday rotation angle on the second Faraday element is 15 degrees and the angle which is defined by the optical axes of the polarizer and analyzer is 90 degrees. Note that the measurement wavelength is 1545 nm and the temperature is 25° C.

In the case where the second Faraday element is positioned in a manner so as to be sandwiched by the polarizer and the first Faraday element, the optical axis $\theta_f$ of the polarizer is preferably provided as:

$\theta_f = \theta_{1k}/2 + n\pi/2$ (where $n=0, 1$)

This is because there is difference in the polarization plane of incidence on the first Faraday element between the cases of a presence and an absence of a second Faraday element between the polarizer and the first Faraday element. For example, in the case where the Faraday rotation angle on the first Faraday element at an electromagnet magnetic field of zero is 96 degrees, the Faraday rotation angle on the second Faraday element is -15 degrees, and the angle which is defined by the optical axes of the polarizer and analyzer is 90 degrees, then $\theta_{1k}=15$ degrees (i.e., 90 degrees-(-15 degrees)-90 degrees) and $\theta_f=7.5$ degrees+$n\pi/2$.

Figure 20:
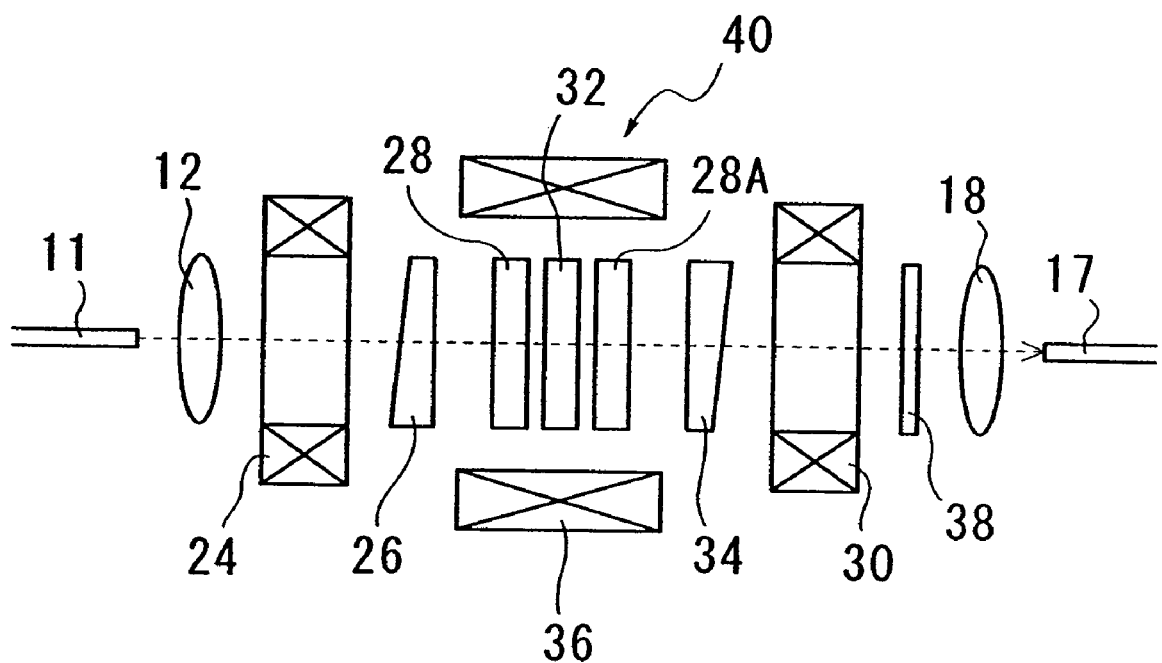
FIG. 20 is a view showing another embodiment of a variable optical attenuator according to the present invention.

FIG. 20 shows another embodiment of a variable optical attenuator according to the present invention. This variable attenuator has an input fiber 11, a lens 12, a polarizer 26, a Faraday rotation angle varying device 40, an analyzer 34, an optical filter 38, a lens 18, and an output fiber 17. The polarizer 26 and the analyzer 34 are both formed by wedge-shaped birefringent crystal plates (e.g. rutil crystals). The angle which is defined by the optical axes of the polarizer 26 and analyzer 34 is set at 90 degrees. The Faraday rotation angle varying device 40 comprises, on optical path positions, a first Faraday element 28, a second Faraday element 32, a third Faraday element 28A, a pair of permanent magnets 24, 30 (fixed magnetic-field applying means) for magnetically saturating the Faraday elements, and an electromagnet 36 (variable magnetic-field applying means) for changing the Faraday rotation angle on the first and third Faraday elements 28, 28A. Note that, in this embodiment, the polarizer 26 is inserted between the permanent magnet 24 and the first Faraday element 28, while the analyzer 34 is inserted between the third Faraday element 28A and the permanent magnet 30. Herein, the first Faraday element 28 and the third Faraday element 28A are of the same in structure, whereas the second Faraday element 32 is assumably different with respect to Faraday rotation direction and wavelength-coefficient sign of Faraday rotation angle from the first Faraday element 28 and third Faraday element 28A.

The first Faraday element 28, the second Faraday element 32 and the third Faraday element 28A are built, in the order, in a magnetic field which is parallel with alight ray direction, due to the permanent magnets 24, 30, and in a magnetic field which is orthogonal to the light ray direction, due to the electromagnet 36. The second Faraday element 32 assumably uses a material having a high coercive force (or a material having a great vertical magnetic anisotropy) so as to exhibit a characteristic of being almost free from change against a variable magnetic field.

When the magnetic field which is applied by the electromagnet 36 is zero, the first and third Faraday elements 28, 28A and the second Faraday element 32 have a magnetization direction in the light ray direction. In case a magnetic field by the electromagnet 36 is applied, there is a rotation of the magnetization direction on the first and third Faraday elements 128, 28A, whereas there is no rotation of the magnetization direction on the second Faraday element 32 because of a high coercive force. Consequently, the Faraday rotation angle of the Faraday rotation angle varying device 40 changes according to a change in the Faraday rotation angle on the first and third Faraday elements 28, 28A. The wavelength dependence of Faraday rotation angle is decreased by the second Faraday element 32.

For the light entering in a forward or reverse direction, provided that the rotation angle by the second Faraday element 32 in a crossed-Nicols state is $\theta_{1k}$, the polarizer optical-axis angle $\theta_f$ with respect to an electromagnetic field direction by the variable magnetic-field applying means is given as:

$\theta_f = \theta_{1k}/2 + n\pi/2$ (where $n=0$).

With this structure, the optical axis of the polarizer in the forward and reverse directions can be set in a position so as to be free from the affection of the Cotton-Mouton effect. Due to this, high attenuation is obtained in the respective forward and reverse directions. Also, because the input and the output aides are in symmetry, the structure does not require to distinguish between input and output.

The optical filter 38 has a wavelength-dependent loss which is at least reverse in sign to a wavelength-dependent loss to be caused by a structure in the absence of an optical filter, similar to the foregoing embodiment. In this embodiment, the optical filter 38 is inserted between the permanent magnet 30 and the lens 18. The optical filter 38 has an optical filter film having a desired characteristic that is formed by a dielectric multi-layer film on a glass substrate, similar to the foregoing embodiment.

For example, one example of the composition and physical property of the Faraday elements is described below.

[First Faraday Element]
Composition: $Tb_{1.00}Y_{0.65}Bi_{1.35}Fe_{4.05}Ga_{0.95}O_{12}$
Faraday rotation angle at an electromagnet magnetic field of zero: 48 degrees
Wavelength change ratio: -0.15%/nm

[Second Faraday Element]
Composition: $Gd_{1.00}Y_{0.75}Bi_{1.25}Fe_{4.00}Ga_{1.00}O_{12}$
Faraday rotation angle at an electromagnet magnetic field of zero: -15 degrees
Wavelength change ratio: +0.15%/nm

[Third Faraday Element]
Composition: $Gd_{1.00}Y_{0.65}Bi_{1.35}Fe_{4.05}Ga_{0.95}O_{12}$
Faraday rotation angle at an electromagnet magnetic field of zero: 48 degrees
Wavelength change ratio: -0.15%/nm With such a combination, concerning the incident light in the forward direction, a crossed-Nicols state was reached when the first and third Faraday elements 28, 28A had a total rotation angle of 15 degrees, thereby obtaining an attenuation amount of 35 dB or higher. At the same time, concerning the incident light in the reverse direction, an attenuation amount of 35 dB or higher was obtained. A characteristic similar to the foregoing embodiment was obtained, thus improving the wavelength dependence and temperature characteristic.

The above embodiment of the present invention, as in the above, is provided with an optical filter functioning part having a wavelength-dependent loss which is at least reverse in sign to a wavelength-dependent loss to be caused by the conventional optical attenuator (in the absence of an optical filter functioning part), thereby making it possible to greatly reduce the wavelength-dependent loss in a high light attenuation range as compared to the conventional characteristic.

In a wavelength division multiplex transmission system using erbium-added optical fiber amplifiers in multiple stages, an optical attenuator is used for level adjustment of an amplified signal light. At this time, the resultant signal light causes a wavelength-dependent loss due to an optical device such as an optical attenuator, which worsens a gain-flatness characteristic of the wavelength division multiplex transmission system. Consequently, the variable optical attenuator of the present invention, which is capable of suppressing, to the minimum, the wavelength-dependent loss upon light attenuation, is particularly effective for such an application.

In case a Faraday rotation angle varying device is structured with a first Faraday element, a second Faraday element that is different in the Faraday rotation direction with respect to the first Faraday element and a third Faraday element that is the same in the Faraday rotation direction as the first Faraday element, which Faraday elements being arranged in order from first through third, together with fixed magnetic-field applying means for magnetically saturating all the Faraday elements and variable magnetic-field applying means for changing the rotation angle on the first and third Faraday elements, then the characteristic is nearly the same between the forward and reverse directions, there is no requirement to distinguish between input and output. Consequently, the use is possible with high characteristic in the both direction of optical signals, besides ease of use and a decreased likelihood of an incorrect set up.

The explanations provided above were made with reference to the preferred embodiment of the present invention. However, the present invention is not limited to these embodiments and can be modified in various ways within the scope of the following claims.

What is claimed is:

1. A Faraday rotation device comprising: a plurality of permanent magnets having through-holes and magnetized in an axial direction of the through-hole; and a plurality of Faraday elements having a same Faraday rotation direction with respect to a same magnetization direction; the permanent magnets being arranged directed in the same magnetization direction along an optical path; part of the Faraday elements being accommodated in the through-hole of the permanent magnet; the remaining permanent magnets being arranged between the plurality of permanent magnets; whereby the part of the Faraday elements and the remaining Faraday elements are to be applied by magnetic fields in opposite directions.

2. A Faraday rotation device according to claim 1, comprising two permanent magnets and a plurality of Faraday elements, part of the Faraday elements being accommodated in a through-hole of one of the permanent magnets, the remaining Faraday elements being arranged between both of the permanent magnets.

3. Faraday rotation device according to claim 1, comprising two permanent magnets and three or more Faraday elements, part of the Faraday elements being accommodated in through-holes of both of the permanent magnets, the remaining Faraday elements being arranged between the both of the permanent magnets.

4. A Faraday rotation device according to claim 1, wherein the Faraday elements are all magnetically saturated by the magnetic field of the permanent magnets.

5. An optical device using the Faraday rotation device according to claim 1, having a polarizer arranged on an input side of and an analyzer arranged on an output side of an arrangement group of the plurality of Faraday elements thereof.

6. An optical device according to claim 5, wherein the polarizer and the analyzer use wedge-shaped birefringent plates, an input fiber collimator having an input fiber and a collimating lens being arranged on an input side of the polarizer, an output fiber collimator having an output fiber and a collimating lens being arranged on an output side of the analyzer.

7. A Faraday rotation device comprising: a plurality of permanent magnets having through-holes and magnetized in an axial direction of the through-hole; a plurality of Faraday elements having a same Faraday rotation direction with respect to a same magnetization direction; and variable magnetic field applying means; each of the permanent magnets being arranged in a manner directed in the same magnetization direction along an optical path; the plurality of Faraday elements including part of the Faraday elements accommodated in the through-hole at least of one of the permanent magnets; the remaining permanent magnets being arranged between the plurality of permanent magnets; the plurality of permanent magnets applying magnetic fields in opposite directions to the part of Faraday elements and the remaining Faraday elements; the variable magnetic field applying means applying a magnetic field in a direction different from a light ray direction to the remaining Faraday elements.

8. A Faraday rotation device according to claim 7, comprising two permanent magnets and a plurality of Faraday elements, part of the Faraday elements being accommodated in a through-hole of one of the permanent magnets, the remaining Faraday elements being arranged between both of the permanent magnets.

9. A Faraday rotation device according to claim 7, comprising two permanent magnets and three or more Faraday elements, part of the Faraday elements being accommodated in through-holes of both of the permanent magnets, the remaining Faraday elements being arranged between the both of the permanent magnets.

10. A Faraday rotation device according to claim 7, wherein the Faraday elements are all magnetically saturated by the magnetic field of the permanent magnets.

11. An optical device using the Faraday rotation device according to claim 7, having a polarizer arranged on an input side of and an analyzer arranged on an output side of an arrangement group of the plurality of Faraday elements thereof.

12. An optical device according to claim 11, wherein the polarizer and the analyzer use wedge-shaped birefringent plates, an input fiber collimator having an input fiber and a collimating lens being arranged on an input side of the polarizer, an output fiber collimator having an output fiber and a collimating lens being arranged on an output side of the analyzer.

13. An optical attenuator comprising: two permanent magnets having through-holes and magnetized in an axial direction of the through-hole; a plurality of Faraday elements having a same Faraday rotation direction with respect to a same magnetization direction; variable magnetic field applying means; and a polarizer and an analyzer; both of the permanent magnets being arranged in a manner directed in the same magnetization direction along an optical path; the plurality of Faraday elements including part of Faraday elements accommodated in the through-hole of at least one of the permanent magnets; the remaining Faraday elements being arranged between the plurality of permanent magnets; the plurality of permanent magnets applying fixed magnetic fields for magnetic saturation in opposite directions to the part of Faraday element and the remaining Faraday elements; the variable magnetic field applying means applying a variable magnetic field in a direction different from a light ray direction to the remaining Faraday elements; a polarizer being arranged on an input side of and an analyzer being on an output side of an arrangement group of all of the Faraday elements.

14. An optical attenuator according to claim 13, wherein all of the Faraday elements are formed by magnetic garnet single crystals having a same composition and a same property.

15. An optical attenuator according to claim 13, wherein an input fiber collimator having an input fiber and a collimating lens is arranged on an input side of the polarizer while an output fiber collimator having an output fiber and a collimating lens is arranged on an output side of the analyzer.

16. An optical attenuator according to claim 13, comprising two permanent magnets and two Faraday elements, wherein the permanent magnet, the polarizer, the Faraday element, the Faraday element incorporated in the permanent magnet and the analyzer are arranged in an order of from an input side toward an output side along the optical path.

17. An optical attenuator according to claim 16, wherein, provided that a rotation angle by the Faraday element positioned between the permanent magnets in a crossed-Nicols state is $\theta_{1k}$, then a polarizer optical-axis angle $\theta_f$ from an electromagnet magnetic field direction by the variable magnetic field applying means is:

$\theta_f \approx -\theta_{1k}/2 + n\pi/2$ (where n=0, 1).

18. An optical attenuator according to claim 13, comprising two permanent magnets and two Faraday elements, wherein the polarizer, the Faraday element incorporated in the permanent magnet, the Faraday element, the analyzer and the permanent magnet are arranged in an order of from an input side toward an output side along the optical path.

19. An optical attenuator according to claim 18, wherein, provided that a rotation angle by the Faraday element positioned between the permanent magnets in a crossed-Nicols state is $\theta_{1k}$ and a rotation angle by the Faraday element incorporated in the permanent magnet is $\theta_2$, then a polarizer optical-axis angle $\theta_f$ from an electromagnet magnetic field direction by the variable magnetic field applying means is:

$\theta_f \approx -\theta_{1k}/2 - n\pi/2$ (where n=0,1).

20. An optical attenuator according to claim 13, comprising two permanent magnets and three Faraday elements, wherein the polarizer, the Faraday element incorporated in the permanent magnet, the Faraday element, the Faraday element incorporated in the permanent magnet and the analyzer are arranged in an order of from an input side toward an output side along the optical path.

21. An optical attenuator according to claim 20, wherein, provided that a rotation angle by the Faraday element positioned between the permanent magnets in a crossed-Nicols state is $\theta_{1k}$ and a rotation angle by the Faraday element incorporated in the permanent magnet is $\theta_2$, then a polarizer optical-axis angle $\theta_f$ from an electromagnet magnetic field direction by the variable magnetic field applying means is:

$\theta_f \approx -\theta_{1k}/2 + n\pi/2$ (where n=0, 1).

22. An optical attenuator according to claim 13, wherein, provided that a maximum rotation angle by the Faraday element positioned between the permanent magnets is $\theta_{1max}$, a minimum rotation angle is $\theta_{1min}$ and a rotation angle by the Faraday element incorporated in the permanent magnet is $\theta_2$, then a relationship is satisfied as:

$|\theta_{1min}| \leq |\theta_2| \leq |\theta_{1max}|$.

23. An optical attenuator according to claim 13, wherein the polarizer and the analyzer use wedge-shaped birefringent plates, an optical axis of the analyzer is given 0 degree or greater and 90 degree or smaller from an orientation of an optical axis of the polarizer as viewed in a rotation direction on the Faraday element positioned between the permanent magnets.

24. An optical attenuator according to claim 13, wherein an optical filter functioning part is provided which has a wavelength-dependent loss reverse in sign to a wavelength-dependent loss to be caused by the Faraday rotation device.

25. An optical attenuator according to claim 24, wherein, provided that a maximum wavelength-dependent loss gradient in an optical attenuator in the absence of an optical filter functioning part is WDL1 and a minimum wavelength-dependent loss gradient is WDL2, then a wavelength-dependent loss gradient X of the optical filter functioning part is:

$X \approx -(WDL1+WDL2)/2$.

26. An optical attenuator according to claim 24, wherein, provided that a maximum wavelength-dependent loss gradient in an arbitrary service attenuation range in an optical attenuator in the absence of an optical filter functioning part is WDL3 and a minimum wavelength-dependent loss gradient is WDL4, then a wavelength-dependent loss gradient X of the optical filter functioning part is:

$X \approx -(WDL3+WDL4)/2$.

* * * * *